US011638146B2

(12) United States Patent
Cammarota et al.

(10) Patent No.: US 11,638,146 B2
(45) Date of Patent: Apr. 25, 2023

(54) ONBOARDING MULTIPLE ACCESS POINT (MULTI-AP) DEVICE USING DEVICE PROVISIONING PROTOCOL (DPP)

(71) Applicant: QUALCOMM Incorporated, San Diego, CA (US)

(72) Inventors: Rosario Cammarota, San Diego, CA (US); Sai Yiu Duncan Ho, San Diego, CA (US); Brian Michael Buesker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 16/357,196

(22) Filed: Mar. 18, 2019

(65) Prior Publication Data
US 2019/0306710 A1 Oct. 3, 2019

Related U.S. Application Data

(60) Provisional application No. 62/649,559, filed on Mar. 28, 2018.

(51) Int. Cl.
*H04L 29/00* (2006.01)
*H04W 12/06* (2021.01)
(Continued)

(52) U.S. Cl.
CPC .......... *H04W 12/06* (2013.01); *G06F 9/4416* (2013.01); *H04L 41/0806* (2013.01);
(Continued)

(58) Field of Classification Search
CPC ................ H04W 12/06; H04W 76/15; H04W 12/0431; H04W 12/50; H04W 24/02; G06F 9/4416; H04L 63/029
(Continued)

(56) References Cited

U.S. PATENT DOCUMENTS

2011/0199890 A1* 8/2011 Sadan ................... H04W 84/10
370/216
2014/0304323 A1* 10/2014 Alnas ..................... H04W 4/50
709/203

(Continued)

FOREIGN PATENT DOCUMENTS

CN        105472613 A    4/2016
JP         2018042058 A    3/2018

OTHER PUBLICATIONS

Anonymous: "Wi-Fi Alliance Device Provisioning Protocol (DPP)—Draft Released for Public Review and Comments v0.0.23," Wi Fi Alliance, vol. v0.0.23, Jul. 26, 2016 (Jul. 26, 2016), pp. 1-89, XP009501333, Retrieved from the Internet: URL:https://www.wi-fi.org/downloads-registered-guest/Wi-Fi_DPP_Tech_Spec_v0_0_23.pdf [retrieved on Nov. 6, 2017], p. 17-p. 44.

(Continued)

*Primary Examiner* — Brandon Hoffman
*Assistant Examiner* — Michael D Anderson
(74) *Attorney, Agent, or Firm* — Holland & Hart LLP/Qualcomm

(57) ABSTRACT

This disclosure provides systems, methods and apparatus, including computer programs encoded on computer storage media, for onboarding one or more Multi-AP devices using a device provisioning protocol (DPP) and a Multi-AP communication protocol. In one aspect, a first Multi-AP device may determine, during an onboarding process, DPP configuration information that was derived using the DPP. The first Multi-AP device may establish a Multi-AP network configuration between the first Multi-AP device and a second Multi-AP device using the Multi-AP communication protocol based, at least in part, on the DPP configuration information. In one aspect, the DPP configuration information may be derived remotely by the network operator prior to device deployment. In one aspect, a configurator station (Continued)

US 11,638,146 B2

Page 2

(STA) may be delegated as the DPP configurator by the network operator, and may onboard one or more STAs into the Multi-AP network using the DPP and the Multi-AP communication protocol.

35 Claims, 11 Drawing Sheets

(51) Int. Cl.

| | | |
|---|---|---|
| *G06F 9/4401* | (2018.01) | |
| *H04L 9/40* | (2022.01) | |
| *H04W 24/02* | (2009.01) | |
| *H04W 76/15* | (2018.01) | |
| *H04W 88/06* | (2009.01) | |
| *H04L 41/0806* | (2022.01) | |
| *H04W 48/16* | (2009.01) | |
| *H04W 84/12* | (2009.01) | |
| *H04W 12/50* | (2021.01) | |
| *H04W 12/0431* | (2021.01) | |

(52) U.S. Cl.
CPC ....... *H04L 63/029* (2013.01); *H04W 12/0431* (2021.01); *H04W 12/50* (2021.01); *H04W 24/02* (2013.01); *H04W 48/16* (2013.01); *H04W 76/15* (2018.02); *H04W 84/12* (2013.01); *H04W 88/06* (2013.01)

(58) Field of Classification Search
USPC ............................................................ 726/6
See application file for complete search history.

(56) References Cited

U.S. PATENT DOCUMENTS

| | | | |
|---|---|---|---|
| 2015/0023183 A1 | 1/2015 | Ilsar et al. | |
| 2016/0360404 A1* | 12/2016 | Benoit | ................. H04W 12/06 |
| 2016/0360407 A1 | 12/2016 | Benoit et al. | |
| 2018/0054845 A1 | 2/2018 | Lee et al. | |
| 2018/0077255 A1* | 3/2018 | Goto | ....................... H04W 4/50 |
| 2018/0278625 A1* | 9/2018 | Cammarota | .......... H04L 9/3268 |

OTHER PUBLICATIONS

International Search Report and Written Opinion—PCT/US2019/023270—ISA/EPO—dated Jun. 27, 2019.
Taiwan Search Report—TW108110286—TIPO—dated Mar. 28, 2022.

\* cited by examiner

ONBOARDING MULTIPLE ACCESS POINT (MULTI-AP) DEVICE USING DEVICE PROVISIONING PROTOCOL (DPP)

CROSS-REFERENCE TO RELATED APPLICATIONS

This Patent Application claims priority to U.S. Provisional Patent Application No. 62/649,559 filed Mar. 28, 2018 and entitled "ONBOARDING MULTIPLE ACCESS POINT (MULTI-AP) DEVICE USING DEVICE PROVISIONING PROTOCOL (DPP)," and assigned to the assignee hereof. The disclosure of the prior Application is considered part of and is incorporated by reference in this Patent Application.

TECHNICAL FIELD

This disclosure generally relates to the field of communication systems, and, more particularly to onboarding multiple access point (Multi-AP) devices using a device provisioning protocol (DPP) in a Multi-AP Network.

DESCRIPTION OF THE RELATED TECHNOLOGY

A network is comprised of devices that communicate with each other via a communication medium. When the devices are first deployed, the devices typically perform an onboarding process to establish the network or to join an existing network. During the onboarding process, each device is configured with network credentials and parameters to access the communication medium before the device can communicate with other devices of the network. The onboarding process that configures a device for the network may include operations for association, enrollment, authentication, or other operations.

In a network having multiple access points, which may be referred to as a Multi-AP Network, existing methods for onboarding a new device include a push button configuration using Wi-Fi® Protected Setup (WPS), which is also referred to as Wi-Fi® Simple Configuration. A Multi-AP Network typically includes a Multi-AP Controller and one or more Multi-AP agents. WPS push button configuration is typically used to onboard a new Multi-AP agent into the Multi-AP Network via a manual push button process. WPS push button configuration is dependent on a user manually pressing a button on the new device (and in some cases also on an existing device of the network) in order to onboard the device. In addition to the user manually pressing one or more buttons, the user may need to troubleshoot the devices and the network if the onboarding process is not successful. Thus, the user experience may be negatively affected if technical issues arise during the onboarding process when the user is involved in configuring the devices to the network.

SUMMARY

The systems, methods and devices of this disclosure each have several innovative aspects, no single one of which is solely responsible for the desirable attributes disclosed herein.

One innovative aspect of the subject matter described in this disclosure can be implemented in a first Multi-AP device to onboard one or more Multi-AP devices using a device provisioning protocol (DPP) and a Multi-AP communication protocol. The first Multi-AP device may determine, during an onboarding operation, DPP configuration information derived using the DPP, and establish a Multi-AP network configuration between the first Multi-AP device and a second Multi-AP device using the Multi-AP communication protocol based, at least in part, on the DPP configuration information.

In some implementations, the DPP configuration information may be derived using the DPP during a pre-onboarding process performed remotely by a network operator prior to deployment.

In some implementations, the first Multi-AP device may be a Multi-AP Controller configured as a DPP configurator, and the second Multi-AP device may be a Multi-AP Agent configured as a DPP enrollee or peer, or the first Multi-AP device may be a first Multi-AP Agent configured as a DPP configurator, and the second Multi-AP device may be a second Multi-AP Agent configured as a DPP enrollee or peer.

In some implementations, establishing the Multi-AP network configuration between the first Multi-AP device and the second Multi-AP device using the Multi-AP communication protocol based, at least in part, on the DPP configuration information may include the first Multi-AP device and the second Multi-AP device exchanging messages associated with the Multi-AP communication protocol that include one or more connectors derived using the DPP.

In some implementations, each of the one or more connectors may include a tuple of a group identifier, a network role, and a network access provisioning key.

In some implementations, the Multi-AP communication protocol may include an IEEE 1905.1 protocol, and establishing the Multi-AP network configuration between the first Multi-AP device and the second Multi-AP device using the Multi-AP communication protocol based, at least in part, on the DPP configuration information may include the first Multi-AP device and the second Multi-AP device exchanging IEEE 1905.1 messages that include one or more connectors derived using the DPP to establish an IEEE 1905.1 configuration.

In some implementations, the first Multi-AP device may exchange IEEE 802.11 messages including the one or more connectors with the second Multi-AP device to establish an IEEE 802.11 connection between the first Multi-AP device and the second Multi-AP device.

In some implementations, the first Multi-AP device may determine a connector associated with the first Multi-AP device, generate an IEEE 802.11 message including the connector, digitally sign at least a portion of the IEEE 802.11 message including the connector with a configurator private signing key, and provide the digitally signed IEEE 802.11 message to the second Multi-AP device for verification of the connector using a configurator public verification key.

In some implementations, the first Multi-AP device may determine a connector associated with the first Multi-AP device, generate an IEEE 1905.1 message including the connector, digitally sign at least a portion of the IEEE 1905.1 message including the connector with a configurator private signing key, and provide the digitally signed IEEE 1905.1 message to the second Multi-AP device for verification of the connector using a configurator public verification key.

In some implementations, the first Multi-AP device may receive, from a network operator, a bootstrap key associated with a network device being onboarded into a Multi-AP Network, and may authenticate and configure the network device using the DPP based, at least in part, on the bootstrap key received from the network operator.

In some implementations, the network device may be a station (STA) or Multi-AP Agent being onboarded into the Multi-AP Network. The bootstrap key may be determined by the network operator after performing part of the DPP remotely prior to deployment of the STA or the Multi-AP Agent.

In some implementations, the network device may be a Multi-AP Agent being onboarded into the Multi-AP Network. The bootstrap key may be received from a STA via the network operator, where the bootstrap key may be determined by the STA after performing part of the DPP.

In some implementations, the first Multi-AP device may provide a DPP authentication request to the network device. The DPP authentication request may be tunneled via at least a first IEEE 1905.1 message by the second Multi-AP device to the network device for authentication. The first Multi-AP device may receive a DPP authentication response tunneled via at least a second IEEE 1905.1 message by the second Multi-AP device from the network device, and may validate the DPP authentication response received from the network device based, at least in part, on the bootstrap key.

In some implementations, the first Multi-AP device may receive a DPP configuration request tunneled via at least a first IEEE 1905.1 message by the second Multi-AP device from the network device for configuring the network device into the Multi-AP Network. The first Multi-AP device may configure the network device based, at least in part, on the DPP configuration request, and provide a DPP configuration response to the network device. The DPP configuration response may be tunneled via at least a second IEEE 1905.1 message by the second Multi-AP device.

Another innovative aspect of the subject matter described in this disclosure can be implemented in a configurator station (STA) to onboard a first STA using the DPP and a Multi-AP communication protocol. The configurator STA may initiate the DPP during an onboarding process for the first STA, determine DPP configuration information based on DPP message exchanges between the configurator STA and the first STA according to the DPP, and establish a Multi-AP network configuration between the first STA and a Multi-AP device of a Multi-AP network using the Multi-AP communication protocol based, at least in part, on the DPP configuration information.

In some implementations, the configurator STA may provide the DPP configuration information to the Multi-AP device. The Multi-AP device may store the DPP configuration information and provide the DPP configuration information to a network operator.

In some implementations, the configurator STA may be configured as a DPP configurator, the first STA may be configured as a DPP enrollee, and the Multi-AP device may be a Multi-AP Controller or a Multi-AP Agent.

Another innovative aspect of the subject matter described in this disclosure can be implemented in a first Multi-AP device to onboard at least a second Multi-AP device using a device provisioning protocol (DPP) and a Multi-AP communication protocol. The first Multi-AP device may include means for determining, during an onboarding process, DPP configuration information derived using the DPP, and means for establishing a Multi-AP network configuration between the first Multi-AP device and the second Multi-AP device using the Multi-AP communication protocol based, at least in part, on the DPP configuration information.

Another innovative aspect of the subject matter described in this disclosure can be implemented in a first Multi-AP device to onboard at least a second Multi-AP device using a device provisioning protocol (DPP) and a Multi-AP communication protocol. The first Multi-AP device may include a network interface configured to receive DPP configuration information associated with the second Multi-AP device. The first Multi-AP device also may include a processor coupled with the network interface, the processor may be configured to determine, during an onboarding process, DPP configuration information derived using the DPP, and establish a Multi-AP network configuration between the first Multi-AP device and the second Multi-AP device using the Multi-AP communication protocol based, at least in part, on the DPP configuration information.

Details of one or more implementations of the subject matter described in this disclosure are set forth in the accompanying drawings and the following description. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
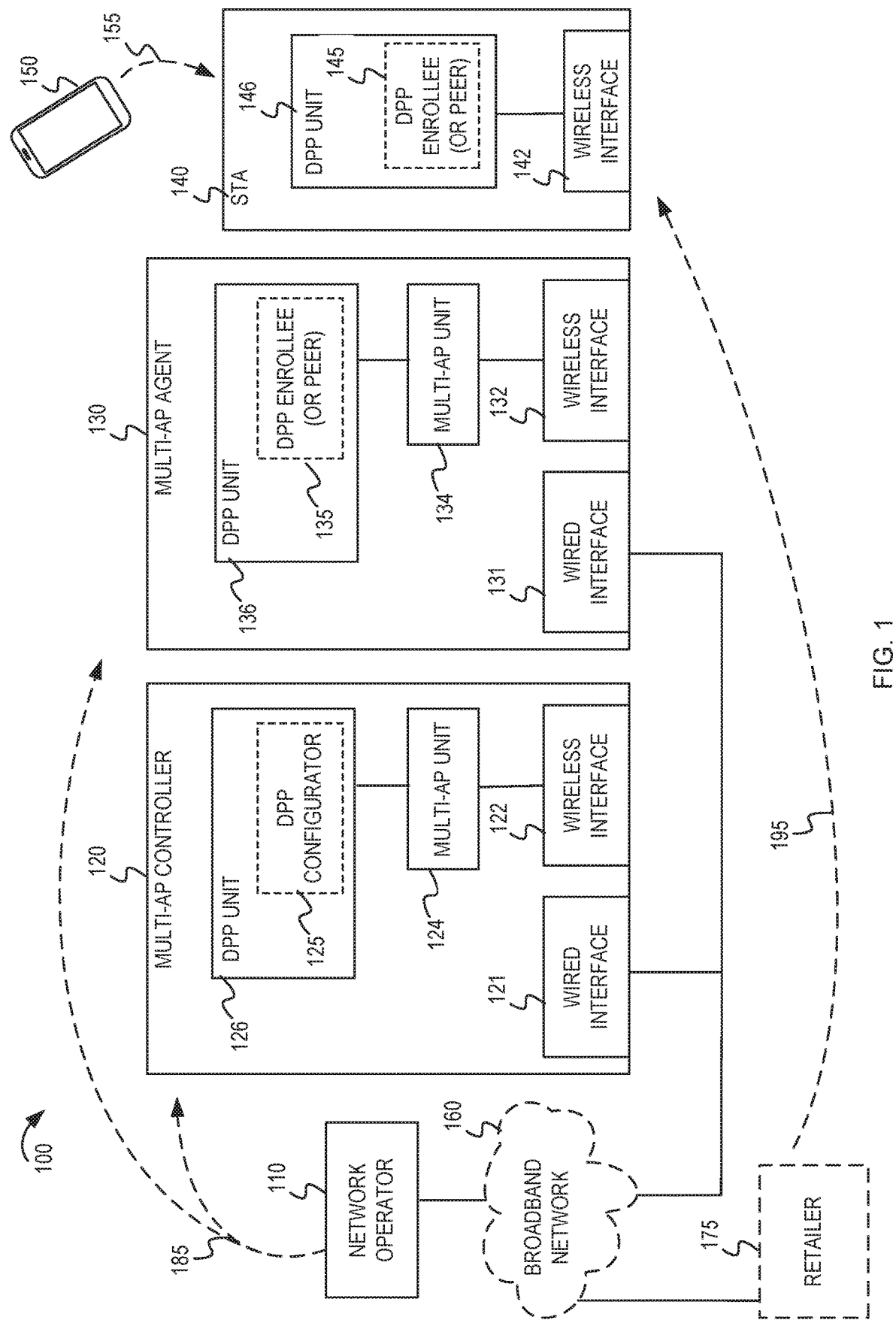
FIG. 1 shows an example system diagram to introduce concepts of onboarding Multi-AP devices using both a device provisioning protocol (DPP) and the Multi-AP based protocols.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A Multi-AP Network may include two or more Multi-AP devices, and also may include one or more stations (STAs). The Multi-AP devices may include a Multi-AP Controller and one or more Multi-AP Agents. A Multi-AP Controller may be a logical entity that implements logic for controlling the operation of the Multi-AP Network. The Multi-AP Controller may be implemented in an AP (which may be referred to as a root AP, or RAP) that provides wireless coverage in addition to controlling the operation of the Multi-AP Network. The Multi-AP Controller may be implemented in a different type of network device (such as a gateway or router) that does not itself provide wireless coverage, but can communicatively couple to a broadband network and to one or more APs that provide wireless connectivity. A Multi-AP Agent may be a logical entity that executes some functions for the Multi-AP Controller for controlling the operation of the Multi-AP Network. The Multi-AP Agent may be implemented in an AP that provides wireless coverage in the Multi-AP Network, and may support one or more STAs. A STA also may be referred to as a client STA, and if the STA does not have AP capabilities, also may be referred to as a non-AP STA.

During deployment of a Multi-AP device into the Multi-AP Network, the Multi-AP Controller (and in some cases also an existing Multi-AP Agent) may perform operations to onboard a new Multi-AP device. Typically, the onboarding process is performed using a push button configuration using Wi-Fi Protected Setup (WPS), which is also referred to as Wi-Fi Simple Configuration. Onboarding a new Multi-AP device using WPS push button configuration requires user involvement in the configuration process, and also may necessitate user involvement in any troubleshooting when technical issues arise in the configuration process. Also, onboarding a new Multi-AP device using WPS push button configuration may not provide strong security at least because there is no authentication that the new Multi-AP device being onboarded is trusted. In some scenarios, a network operator may want to restrict devices that are deployed into the network to trusted devices that have been qualified by the network operator. Furthermore, there may be a window of time when a new Multi-AP device is onboarded using WPS push button configuration into the wrong network, or another Multi-AP device that is not under the user's control may be onboarded into the user's Multi-AP Network, if a neighbor network also performs WPS push button configuration during the same window of time.

In some implementations, one or more Multi-AP devices may be onboarded using both a device provisioning protocol (DPP) and Multi-AP communication protocols. The Multi-AP communication protocols may include the IEEE 1905.1 communication protocols and extensions to the 1905.1 communication protocols defined by other standards bodies. For example, the DPP may be performed remotely during a pre-onboarding process by a network operator prior to deployment of the one or more Multi-AP devices, or may be performed by the network operator during deployment and installation of the one or more Multi-AP devices. The network operator may be the owner of the Multi-AP devices, which also may provide network services (such as broadband Internet service) and other multimedia services to the user. During the DPP, configuration information for the one or more Multi-AP devices is generated and stored by the network operator. The configuration information may be used by the network operator to remotely manage the one or more Multi-AP devices of the Multi-AP Network that will be established in a household, office, or other environment upon deployment.

During the pre-onboarding process, the network operator also may delegate a configurator role or capability to the Multi-AP Controller by configuring the Multi-AP Controller as a DPP configurator. The remaining Multi-AP devices may be configured as DPP enrollees (which will be referred to as DPP peers after the onboarding process). When the one or more Multi-AP devices are deployed and the power is turned on, the Multi-AP Controller that is delegated as the DPP configurator may automatically exchange IEEE 1905.1 packets that include the configuration information derived from the DPP (which also may be referred to as DPP configuration information), and exchange additional packets, in order to seamlessly perform the onboarding process and establish a secure Multi-AP Network without user involvement. After the initial deployment, additional onboarding processes may be performed to add or replace Multi-AP Agent(s) or STAs to the Multi-AP Network, or to replace the Multi-AP Controller.

The DPP may be used to facilitate configuration of the DPP enrollee device(s) being introduced to the network. For example, the DPP may provide authentication and authenticated key establishment between the DPP enrollee device (which also may be referred to as an enrollee device) and the DPP configurator device (which also may be referred to as a configurator device). The DPP configurator device may provide the configuration used by the DPP enrollee device to join the network. Each of the DPP enrollee device and the DPP configurator device may have a public bootstrap key (also sometimes referred to as a public identity key) which is trusted between the devices and which can be used for an initial authentication. When a public bootstrap key of another device is obtained using an out-of-band technique, the process of obtaining the public bootstrap key is referred to as "bootstrapping." Bootstrapping provides trust in the public bootstrap key because the out-of-band technique typically involves proximity or physical association with the enrollee device. For example, bootstrapping may include scanning a Quick Response® (QR) code that encodes the public bootstrap key, or using Near-field communication (NFC) to obtain the public bootstrap key.

In some implementations, an online or physical merchant, retailer, or other third-party entity may remotely perform part of the DPP process for a new STA that will be onboarded in a Multi-AP Network. For example, a customer may buy or lease a new STA (such as a tablet computer, gaming console, or television) from a retailer to add to the Multi-AP Network at the customer's home or office. The retailer may perform part of the DPP process to configure the STA as a DPP enrollee and obtain public bootstrap key for the STA prior to shipping or providing the STA to the customer. The retailer may securely transmit (such as via the Internet) the public bootstrap key to the network operator. The network operator may then securely transmit the public bootstrap key to the Multi-AP Controller that has been delegated as the DPP configurator at the customer's home or office. When the new STA is powered on, the Multi-AP Controller may seamlessly perform the remaining portion of the DPP process to obtain the DPP configuration information, and exchange additional messages according to the IEEE 1905.1 protocol for onboarding the new STA. In some implementations, the online or physical merchant or retailer may be the network operator. The network operator may be both the operator of the network and also run one or more retailers. For example, the network operator may have physical or online retail stores where customers can lease or purchase new devices (such as a STA or a Multi-AP Agent) that can be added to the Multi-AP Network.

In some implementations, the network operator may delegate the DPP configurator role to a configurator STA (or to an operator-approved configurator application that is downloadable to the STA) that can be used by the user of the Multi-AP Network to onboard a new STA into the Multi-AP Network. The network operator may supply the user the configurator STA that is pre-loaded with a configurator application (or preconfigured as the DPP configurator), or the network operator may provide a downloadable configurator application that the user can download to the STA to configure the STA as the DPP configurator. The user may use the configurator STA to perform the DPP, determine the DPP configuration information, and exchange other messages for onboarding the new STA into the Multi-AP Network. The configurator STA also may provide a backup of the DPP configuration information to the Multi-AP Controller via the Multi-AP Agent or directly to the Multi-AP Controller, and the Multi-AP Controller may then provide the backup of the DPP configuration information to the network operator.

Particular implementations of the subject matter described in this disclosure can be implemented to realize one or more of the following potential advantages. Onboarding Multi-AP devices using both the DPP and a Multi-AP based protocol (such as IEEE 1905.1 protocols) may seamlessly configure the devices and the network with little or no user involvement. The network operator also may remotely manage the network configuration, and also may perform troubleshooting, reconfiguration, and upgrades remotely with little to no user involvement. Furthermore, the user of the Multi-AP Network may onboard additional STAs easily and seamlessly after a retailer performs part of the DPP process remotely and communicates with the network operator, or by using a configurator STA that is delegated as a DPP configurator by the network operator. Onboarding Multi-AP devices using both the DPP and a Multi-AP based protocol (such as IEEE 1905.1 protocols) also may utilize enhanced security features.

FIG. 1 shows an example system diagram to introduce concepts of onboarding Multi-AP devices using both the DPP and the Multi-AP based protocols. The example system 100 includes a network operator 110, a Multi-AP Controller 120, a Multi-AP Agent 130, a client STA 140, and a retailer 175. The Multi-AP Network, which is a local area network (LAN), may include the Multi-AP Controller 120, the Multi-AP Agent 130, and the STA 140. The Multi-AP Network is communicatively coupled to a broadband network 160, such as the Internet. The broadband network 160 also may be referred to as a wide area network (WAN). The network operator 110, the retailer 175, and the Multi-AP Network may communication with one another via the broadband network 160.

The Multi-AP Controller 120 may include a wired interface 121, a wireless interface 122, a Multi-AP unit 124, and a DPP unit 126. The Multi-AP Agent 130 may include a wired interface 131, a wireless interface 132, a Multi-AP unit 134, and a DPP unit 136. The STA 140 may include a wireless interface 142 and a DPP unit 146. The wired interfaces 121 and 131 may be used for wired network communications, such as Ethernet, Powerline communications (PLC), or Multimedia over Coax (MoCA®). The wireless interfaces 122, 132, and 142 may be used for wireless network communications (which also may be referred to as wireless local area network (WLAN) communications), such as wireless communication protocols specified in the IEEE 802.11 standard specifications.

The Multi-AP units 124 and 134 may implement communication protocols for a Multi-AP Network, which may be referred to as Multi-AP based protocols (or Multi-AP communication protocols), such as IEEE 1905.1 communication protocols and IEEE 802.11 communication protocols. The DPP units 126, 136, and 146 may implement the DPP, and also may be configured to operate in a particular network role defined in the DPP specification. For example, the DPP unit 126 may be configured as a DPP configurator 125, which configures the Multi-AP Controller 120 to perform operations associated with a DPP configurator. The DPP unit 136 may be configured as a DPP enrollee 135, which configures the Multi-AP Agent 130 to perform operations associated with a DPP enrollee. The DPP unit 146 also may be configured as a DPP enrollee 145, which configures the STA 140 to perform operations associated with a DPP enrollee. Once a DPP enrollee is provisioned into the network, the DPP enrollee is referred to as a DPP peer.

In some implementations, in order to establish the Multi-AP Network, the Multi-AP Controller 120 and the Multi-AP Agent 130 may be onboarded using both the DPP and Multi-AP communication protocols, such as the 1905.1 communication protocols. The network operator 110 may perform the DPP remotely during a pre-onboarding process prior to deployment of the Multi-AP Controller 120 and the Multi-AP Agent 130 to the destination. For example, during the pre-onboarding process, the network operator 110 may take the network role of the DPP configurator and perform the DPP for the Multi-AP Controller 120 and the Multi-AP Agent 130. During the DPP, configuration information (which also may be referred to as DPP configuration information) for each of the Multi-AP Controller 120 and the Multi-AP Agent 130 is generated and stored by the network operator 110. The network operator 110 may store the DPP configuration information in a database that associates the DPP configuration information with the corresponding Multi-AP Network (in a household, office, or other location). The DPP configuration information may be used by the network operator 110 to remotely manage the Multi-AP devices of the Multi-AP Network upon deployment. During the pre-onboarding process, the network operator 110 also may delegate a configurator role or capability to the Multi-AP Controller 120 by configuring the DPP unit 126 of the Multi-AP Controller 120 as a DPP configurator 125 prior to deployment. The remaining Multi-AP devices may be configured as DPP enrollees (which will be referred to as DPP peers after the onboarding process). In some implementations, the network operator 110 may delegate the network roles or capabilities (such as the DPP configurator role or capability to the Multi-AP Controller 120), or may change which device is delegated the DPP configurator role, remotely after deployment via the broadband network 160. The various messages that are exchanged during the DPP process will be described further in FIG. 2.

After the pre-configuration process, the network operator 110 may deploy the Multi-AP Controller 120 and the Multi-AP Agent 130 to the destination (shown by arrow 185). For example, the network operator 110 may install the Multi-AP devices at the destination. The STA 140 may be a device owned by the user of the Multi-AP Network, which may be onboarded separately by the user after the Multi-AP Network is established. When the Multi-AP devices are deployed and the power is turned on, the Multi-AP Controller 120 and the Multi-AP Agent 130 may first exchange, via the wireless interfaces 122 and 132, discovery, authentication, and association packets to establish a wireless communication link, according to IEEE 802.11 protocols. The Multi-AP Controller 120 and the Multi-AP Agent 130 may then exchange various IEEE 1905.1 packets, such as IEEE 1905.1 authentication packets that include the DPP configuration information to seamlessly authenticate one another. In some implementations, DPP frames may be transported over IEEE 1905.1 packets by defining the DPP configurator and DPP enrollee (or peer) layers on top of the Multi-AP layer at the Multi-AP Controller 120 and Multi-AP Agent 130, respectively. The Multi-AP Controller 120 that is delegated as the DPP configurator may exchange IEEE 1905.1 authentication packets that include the DPP configuration information with the Multi-AP Agent 130 (and any other Multi-AP Agent that is included in the initial deployment), and also exchange additional IEEE 1905.1 packets in order to complete the onboarding process and establish the Multi-AP Network, as will be further described in FIGS. 3 and 4. After the initial deployment, additional onboarding processes may be performed to add or replace Multi-AP Agent(s) or client STAs to the Multi-AP Network, or to replace the Multi-AP Controller.

In some implementations, a retailer 175 (such as an online or physical retailer, or other third-party entity) or the network operator 110 may remotely perform part of the DPP process to onboard a new STA (such as STA 140) (or a new Multi-AP Agent) in the Multi-AP Network. For example, a customer may buy or lease the STA 140 from the retailer 175 to add to the Multi-AP Network at the customer's home or office. The STA 140 may be various types of devices, such as a laptop computer, a tablet computer, a smart appliance, a gaming console, among others. The retailer 175 may perform part of the DPP process to obtain a public bootstrap key for the STA 140 prior to the retailer 175 shipping the STA 140 to the customer, or prior to the customer leaving the retailer 175 with the STA 140. The retailer 175 may securely transmit (such as via the Internet) the public bootstrap key to the network operator 110. The network operator 110 may then securely transmit the public bootstrap key to the Multi-AP Controller 120 that has been delegated as the DPP configurator 125. In some implementations, the network operator 110 may run the retailer 175 (or the retailer 175 may be the network operator). For example, the network operator 110 may have physical or online retail stores (such as the retailer 175) where customers can lease or purchase new devices (such as a STA or a Multi-AP Agent) that can be added to the Multi-AP Network.

After the STA 140 is deployed (shown by arrow 195) and the STA 140 is powered on, the STA 140 seamlessly identifies one of the Multi-AP devices (such as the closest Multi-AP device in the Multi-AP Network) and exchanges DPP messages with the Multi-AP device. For example, the STA 140 may identify either the Multi-AP Agent 130 or the Multi-AP Controller 120. If the Multi-AP Controller 120 is configured as the DPP configurator 125, the STA 140 (which is configured as the DPP enrollee 145) may communicate indirectly with the Multi-AP Controller 120 via the Multi-AP Agent 130, as will be further described in FIG. 5. If the Multi-AP Controller 120 has delegated the DPP configurator role to the Multi-AP Agent 130, the STA 140 (which is configured as the DPP enrollee 145), may communicate directly with the Multi-AP Agent 130, as will be further described in FIG. 6. The STA 140 may then verify bootstrap keys and exchange DPP messages with the Multi-AP Agent 130 or the Multi-AP Controller 120 to perform the remaining portion of the DPP process and obtain the DPP configuration information. After the DPP authentication and configuration, if the devices are communicating wirelessly, the STA 140 and the Multi-AP Agent 130 or the Multi-AP Controller 120 may perform wireless discovery, authentication, and association processes to establish a wireless communication link (according to IEEE 802.11 protocols), and complete the onboarding process, as described in FIGS. 5 and 6.

In some implementations, the network operator 110 may delegate the DPP configurator role to a configurator STA (or to an operator-approved configurator application that is downloadable to the STA), such as configurator STA 150, which can be used by the user of the Multi-AP Network to onboard a new STA (such as STA 140) into the Multi-AP Network. The network operator 110 may supply the user the configurator STA 150 that is pre-loaded with a configurator application (or preconfigured as the DPP configurator), or the network operator 110 may provide a downloadable configurator application that the user can download to the configurator STA 150 to configure the configurator STA 150 as the DPP configurator. The configurator STA 150 may be a portable device with a user interface (UI), such as a mobile phone, a tablet computer, a laptop computer, a smart remote control, a wearable device, among others. The STA 140 may be various types of devices, such as a smart appliance, a gaming console, a television, wireless speakers, a tablet computer, among others. The user may use the configurator STA 150 to begin the onboarding process of the STA 140 (as shown by arrow 155) by performing the DPP, as described in FIG. 2. For example, the configurator STA 150 and the STA 140 may verify bootstrap keys, and perform DPP authentication and DPP configuration. After the DPP authentication and configuration, if the devices are communicating wirelessly, the STA 140 may communicate with the Multi-AP Agent 130 or the Multi-AP Controller 120 to perform wireless discovery, authentication, and association processes to establish a wireless communication link (according to IEEE 802.11 protocols), and complete the onboarding process, as described in FIG. 7. The configurator STA 150 also may provide a backup of the DPP configuration information to the Multi-AP Controller 120 via the Multi-AP Agent 130 or directly to the Multi-AP Controller 120. The Multi-AP Controller 120 may then provide the backup of the DPP configuration information to the network operator 110.

After the Multi-AP Controller 120, the Multi-AP Agent 130, and the STA 140 have been onboarded into the Multi-AP Network, the network operator 110 may continue to manage the Multi-AP Network remotely and determine when Multi-AP devices need to be upgraded or replaced, manage requests to add new Multi-AP devices, or manage troubleshooting to maintain optimal network performance.

Figure 2:
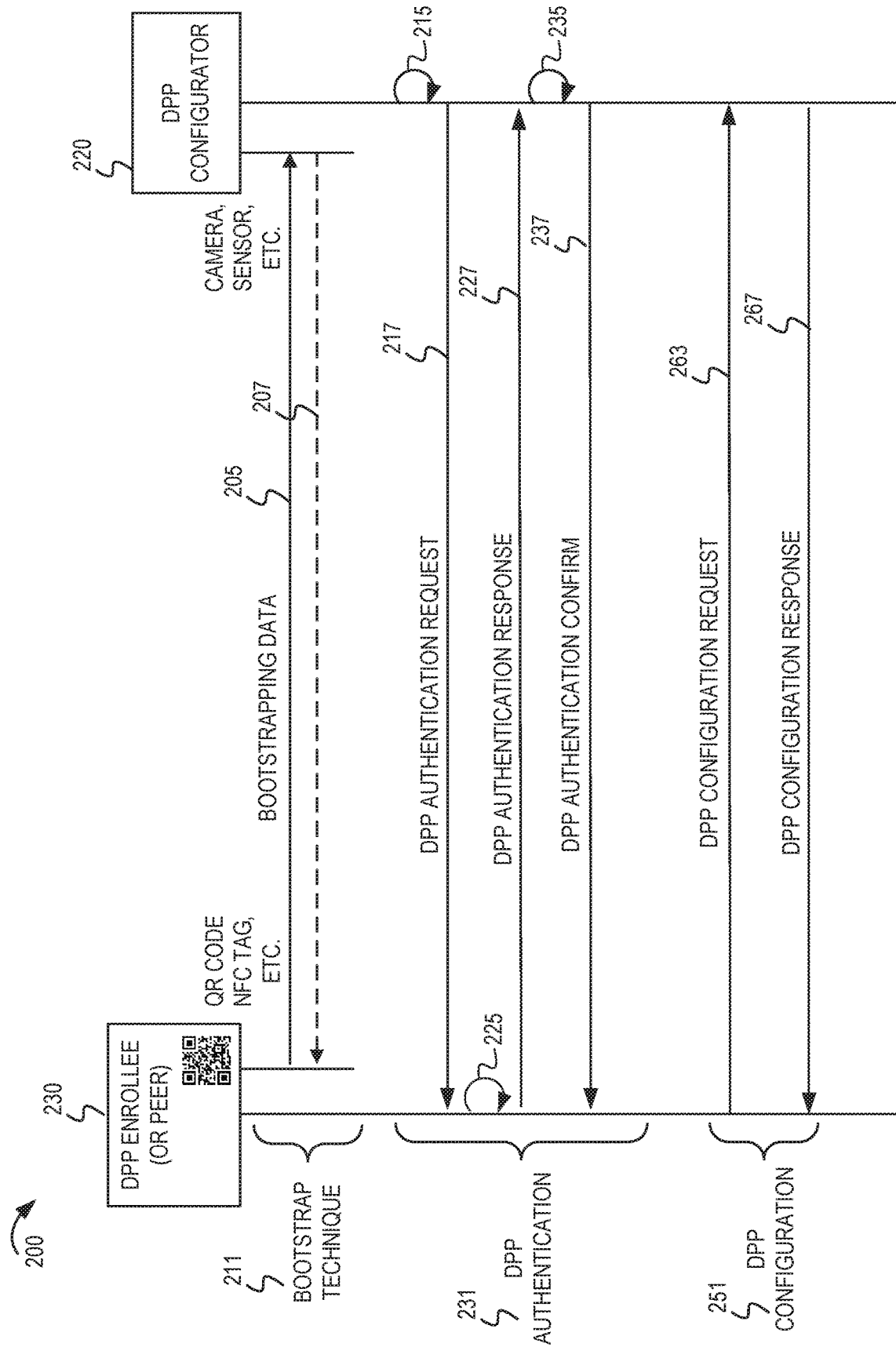
FIG. 2 shows an example message flow diagram of the DPP.

FIG. 2 shows an example message flow diagram of the DPP 200. The DPP 200 may be between one pair of devices, such as the DPP configurator 220 and the DPP enrollee 230, and bootstrapping may be performed by the DPP configurator 220 directly with the DPP enrollee 230. In the DPP 200, the DPP configurator 220 may provide the configuration of the DPP enrollee 230. As described in FIG. 1, the DPP configurator 220 may correspond to the network operator 110 (which may perform the pre-onboarding DPP process), the Multi-AP Controller 120 (which may be delegated as DPP configurator by the network operator 110), the Multi-AP Agent 130 (which may be delegated as DPP configurator by the Multi-AP Controller 120), the configurator STA 150 (which may be delegated as DPP configurator by the network operator 110, or by one of the Multi-AP devices), or the retailer 175 (which may be delegated as DPP configurator by the network operator 110). Depending on the type of onboarding process, the DPP configurator 220 may perform some or all of the DPP operations described in FIG. 2, in addition to message exchanges according to IEEE 1905.1 protocols, in order to onboard Multi-AP devices or STAs, as described in FIGS. 3-11. The DPP 200 shown in FIG. 2 includes three operations: the bootstrap technique (at 211), the DPP authentication (at 231), and the DPP configuration (at 251). The DPP authentication relies on the authenticating party's bootstrapping key having been obtained through the bootstrapping technique.

At 205, the DPP configurator 220 may obtain enrollee bootstrapping data from the DPP enrollee 230. The enrollee bootstrapping data may include the public bootstrap key of the DPP enrollee 230. In some implementations, the enrollee bootstrapping data also may include a Global Operating Class and a Channel Number list. The Global Operating Class and Channel number list may be used to determine which radio parameters or which wireless channel(s) the DPP enrollee 230 will use for DPP authentication. For example, together the Global Operating Class and Channel number list may indicate which wireless channel the DPP enrollee 230 will listen for (or send) a DPP authentication request message.

At 207, in some implementations, the DPP enrollee 230 also may obtain a configurator bootstrapping data from the DPP configurator 220. When both parties obtain each other's bootstrapping data, the DPP authentication can utilize mutual bi-directional authentication.

In addition to the bootstrapping technique shown in FIG. 2, a variety of other bootstrapping techniques may be used. The bootstrapping technique allows a recipient to trust that the bootstrapping data belongs to a particular device. Scanning a two-dimensional matrix barcode (such as a QR code) is a one technique for obtaining bootstrapping data. Another bootstrapping technique is to transfer bootstrapping data over other media that can provide a certain amount of trust to the integrity of the transferred content (for instance USB, NFC, or Bluetooth). Yet another bootstrapping technique is to mask the bootstrapping data with a shared code (the shared code may be a key, phrase, or word used to mask the bootstrapping data). A peer may rely on knowledge of the shared code to mask or unmask the bootstrapping key. If a peer is able to prove it knows and can use the shared code, the peer's bootstrapping data can be trusted.

The DPP authentication phase uses the bootstrapping data, obtained using a bootstrapping technique, to strongly authenticate the configurator and enrollee. The DPP authentication consists of a 3-message exchange and generates a shared secret and authenticated key. At 215, the DPP configurator 220 generates a first nonce, generates a protocol key pair, performs a hash function of the enrollee public bootstrap key, and generates a first symmetric key based on a shared secret derived from the hashed bootstrap data. The DPP configurator 220 sends a DPP Authentication Request message 217 via one or more of the channels in the Channel List. The DPP authentication request message 217 includes the shared secret and the first nonce encrypted by the first symmetric key.

At 225, the DPP enrollee 230 receives the DPP Authentication Request message 217 and checks whether a hash of its public bootstrap key is in the message. If a hash of its public bootstrap key is in the message, the DPP enrollee 230 generates the shared secret and derives the first symmetric key. The DPP enrollee 230 attempts to unwrap the first nonce using the first symmetric key. Next, the DPP enrollee 230 generates a second nonce, a shared secret, and a second symmetric key. The DPP enrollee 230 wraps the two nonces and its capabilities in the first symmetric key and wraps the authenticating tag in the second symmetric key. The DPP enrollee 230 then places a hash of its public bootstrapping key (and optionally includes a hash of the configurators public bootstrapping key if it is doing mutual authentication), its public protocol key, the wrapped nonces along with its wrapped network public key, and the wrapped authentication tag in an DPP Authentication Response message 227. The DPP Authentication Response message 227 is transmitted to the DPP configurator 220.

After receiving a response, the DPP configurator 220 may validate the result at 235 and transmit a DPP Authentication Confirm message 237 to complete the DPP authentication phase. After successful completion of the DPP authentication phase, a secure channel between the DPP configurator 220 and the DPP enrollee 230 is established.

After the DPP authentication is completed, the DPP configurator 220 provisions the DPP enrollee 230 for device-to-device communication or infrastructure communication. As part of this provisioning, the DPP configurator 220 enables the DPP enrollee 230 to establish secure associations with other peers in the network. The DPP enrollee 230 initiates the configuration phase by transmitting a DPP Configuration Request message 263, and is provisioned with configuration information in a DPP Configuration Response message 267. After receiving the DPP Configuration Response message 267, the DPP enrollee 230 is provisioned with the DPP configuration information (which also may be referred to as a DPP configuration object) useable to establish secure access to the network.

The DPP configuration information may be stored both in the DPP configurator 220 and in the DPP enrollee 230 (which may be referred to as DPP peer after configuration). In some implementations, the DPP configuration information may include a configurator public verification key. A configurator private signing key of the DPP configurator 220 may be used to create a digitally signed message. The configurator public verification key may be used by the DPP enrollee 230 to verify the digitally signed message was signed using the configurator private signing key.

In this disclosure, when referring to public keys and private keys, each public key and private key may be related in a key pair. The key pair may include private and public keys which are mathematically linked but are different from each other. The public key may be used to encrypt information or to verify a digital signature. The private key may be used to decrypt the information or to create a digital signature.

Figure 3:
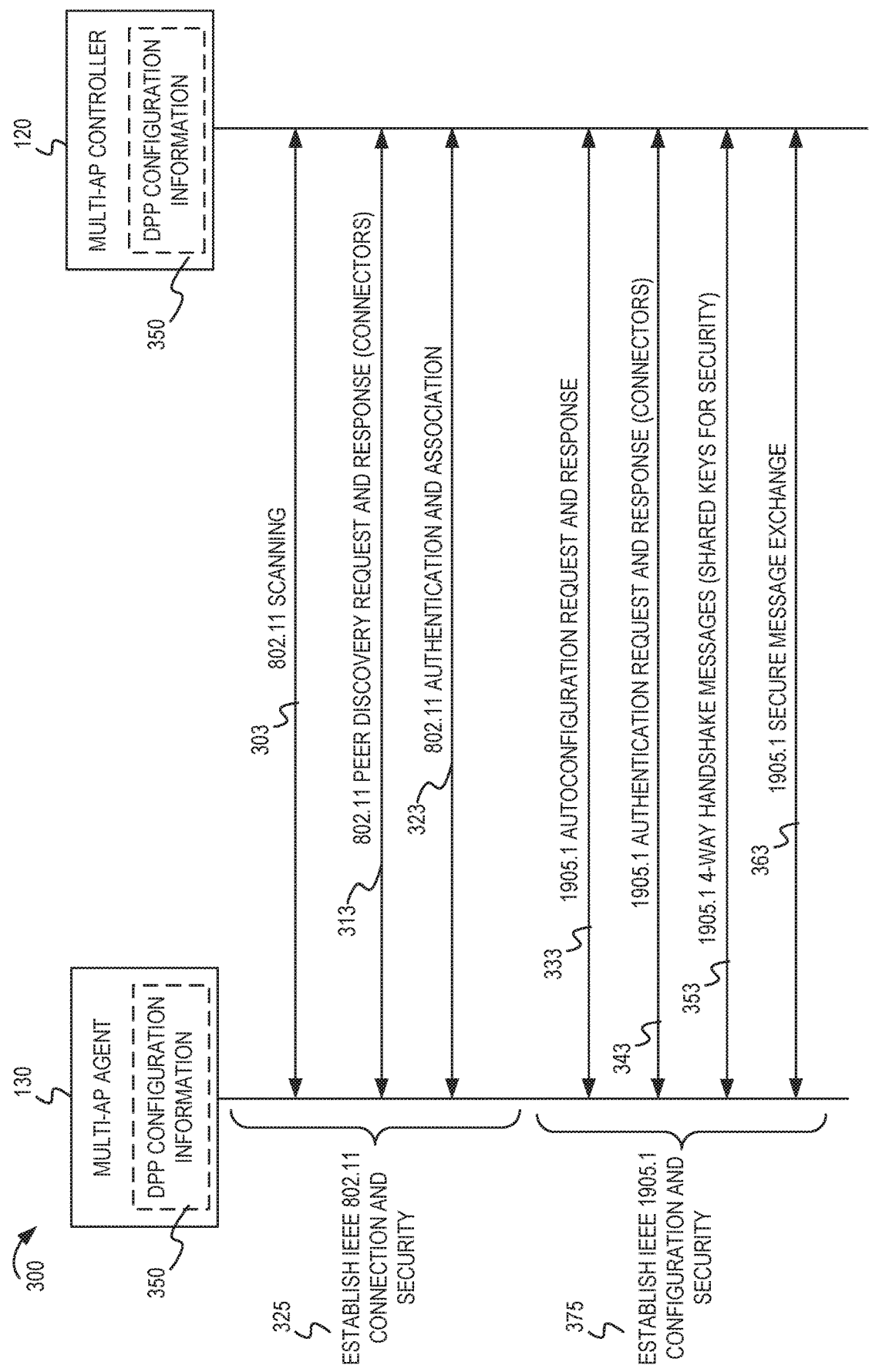
FIG. 3 shows an example message flow diagram of the Multi-AP device onboarding process using the DPP configuration information derived from the DPP performed by the network operator.

FIG. 3 shows an example message flow diagram of the Multi-AP device onboarding process using the DPP configuration information derived from the DPP performed by the network operator. The message flow diagram 300 includes messages between the Multi-AP Controller 120 (configured as the DPP configurator) and the Multi-AP Agent 130 (configured as a DPP peer after the DPP). In some implementations, the onboarding process shown in FIG. 3 is performed after the deployment of the Multi-AP devices to the destination (shown in 185 of FIG. 1) and follows the network operator 110 performing the DPP described in FIG. 2 during a pre-onboarding process. As described in FIG. 2, the network operator 110 determines the DPP configuration information 350 (also referred to as the DPP configuration object) from the DPP, and provisions the Multi-AP Controller 120 and the Multi-AP Agent 130 with the DPP configuration information 350. As described in FIG. 2, the DPP configuration information 350 may include a configurator public verification key.

In some implementations, when the Multi-AP Controller 120 and the Multi-AP Agent 130 have wireless and wired communication capability for the onboarding process shown in FIG. 3, the devices exchange both IEEE 802.11 messages to establish IEEE 802.11 connection and security (at 325), and then exchange IEEE 1905.1 messages to establish 1905.1 configuration and security (at 375). In some implementations, when the Multi-AP Controller 120 and the Multi-AP Agent 130 are only connected via a wired communication medium, or only have wired communication capability, for the onboarding process (such as via an Ethernet cable), the devices only exchange the IEEE 1905.1 messages to establish 1905.1 configuration and security (at 375).

At 303, after the pre-onboarding process performed by the network operator 110, when the Multi-AP Controller 120 and the Multi-AP Agent 130 have wireless communication capability, the Multi-AP Controller 120 and the Multi-AP Agent 130 may perform an IEEE 802.11 scanning process. For example, one of the Multi-AP Controller 120 and the Multi-AP Agent 130 may scan the network for beacon messages or send probe request messages. For example, the Multi-AP Agent 130 may send a probe request message to actively scan the network, and the Multi-AP Controller 120 may respond with a probe response message.

At 313, the Multi-AP Controller 120 and the Multi-AP Agent 130 may exchange Peer Discovery Request and Response frames. In some implementations, the Multi-AP Controller 120 and the Multi-AP Agent 130 may each determine the DPP configuration information 350 that was derived using the DPP during the pre-onboarding process. Also, after the DPP process, the Multi-AP Controller 120 and the Multi-AP Agent 130 may each determine a "connector," which may be a signed introduction that enables a Multi-AP device to get a trusted statement that other devices on the network are permitted to communicate with it. For example, the connector may be a tuple of a group identifier, a network role, and a network access provisioning key. The connector may be signed by the configurator private signing key, and the connector may be verified using the configurator public verification key. In some implementations, the Multi-AP Agent 130 may transmit a Peer Discovery Request frame having the connector associated with the Multi-AP Agent 130. The Multi-AP Controller 120 may receive the Peer Discovery Request frame having the connector and may verify the group identifier, the network role, and other information of the connector. The Multi-AP Controller 120 also may respond to the Multi-AP Agent 130 with a Peer Discovery Response frame having the connector associated with the Multi-AP Controller 120. The Peer Discovery Response frame may be digitally signed with the configurator private signing key. The Multi-AP Agent 130 may verify the digitally signed message with the configurator public verification key and verify the connector received from the Multi-AP Controller 120.

At 323, the Multi-AP Controller 120 and the Multi-AP Agent 130 perform the IEEE 802.11 authentication and association processes, according to the protocols specified in the IEEE 802.11 standard specifications, in order to establish a secure wireless connection with each other.

At 333, the Multi-AP Controller 120 and the Multi-AP Agent 130 exchange IEEE 1905.1 AutoConfiguration Request and Response frames for the Multi-AP devices to discover each other via IEEE 1905.1 protocols. Whether or not a secure wireless connection is established at 325, if the Multi-AP devices are connected via a wired medium, the Multi-AP devices will attempt to discover and authenticate each other using IEEE 1905.1 protocols at 375.

At 343, the Multi-AP Controller 120 and the Multi-AP Agent 130 exchange IEEE 1905.1 Authentication Request and Response frames to exchange connectors in order to verify each other and the network connections via the IEEE 1905.1 protocols.

At 353, the Multi-AP Controller 120 and the Multi-AP Agent 130 perform the IEEE 1905.1 4-way handshake for establishing the IEEE 1905.1 configuration and security. For example, the 4-way handshake may be used to derive and deploy shared secrets or keys for use in IEEE 1905.1 control messages for security. After the 4-way handshake of 353, the Multi-AP Controller 120 and the Multi-AP Agent 130 can communicate by exchanging secure 1905.1 messages, at 363.

In some implementations, after the initial deployment of the bundle of Multi-AP devices to the destination (shown in 185 of FIG. 1) and the performance of the onboarding processes shown in FIGS. 1-3, the network operator 110 may receive an order to deploy additional Multi-AP Agents into a particular Multi-AP Network, or may deploy a Multi-AP Agent to replace a faulty device (or upgrade the network). As described above, after the network operator 110 performs DPP during the pre-onboarding process, the network operator 110 may store the DPP configuration information 350 in database that associates the DPP configuration information 350 with a particular Multi-AP Network and the corresponding Multi-AP devices. Before the additional Multi-AP Agent is deployed to the Multi-AP Network (such as the network shown in FIG. 1), the network operator 110 may configure the additional Multi-AP Agent with the DPP configuration information 350. When the additional Multi-AP Agent is deployed and power is turned on, the new Multi-AP Agent may connect seamlessly with the existing Multi-AP devices (such as the Multi-AP Controller 120 and the Multi-AP Agent 130) by exchanging IEEE 1905.1 messages (shown at 333-363 of FIG. 3) for establishing IEEE 1905.1 network configuration and security. In some implementations, the additional Multi-AP Agent may perform both the message exchanges shown at 303-323 (for establishing IEEE 802.11 connectivity and security) and the message exchanges shown at 333-363 (for establishing IEEE 1905.1 network configuration and security).

In some implementations, after the initial deployment of the bundle of Multi-AP devices to the destination (shown in 185 of FIG. 1) and the performance of the onboarding processes shown in FIGS. 1-3, the network operator 110 may receive an order to deploy a new Multi-AP Controller to replace a faulty device or upgrade the network. Before the new Multi-AP Controller is deployed to the Multi-AP Network (such as the network shown in FIG. 1), the network operator 110 may configure the new Multi-AP controller with the DPP configuration information 350. When the new Multi-AP Controller is deployed and power is turned on, the new Multi-AP Controller may attempt to connect by exchanging IEEE 1905.1 messages (shown at 333-363 of FIG. 3) for establishing IEEE 1905.1 network configuration and security. However, since the new Multi-AP Controller has a different media access control (MAC) address than the previous Multi-AP Controller, the IEEE 1905.1 AutoConfiguration request and response messages (such as the messages at 333) between the existing Multi-AP Agent(s) (such as the Multi-AP Agent 130) and the new Multi-AP Controller may fail. This may trigger a new IEEE 1905.1 authentication request and response message exchange (such as the messages at 343) between each of the existing Multi-AP Agent(s) and the new Multi-AP Controller to exchange the DPP configuration information. Each of the existing Multi-AP Agent(s) and the new Multi-AP Controller also may perform the message exchanges of 353 and 363 for establishing IEEE 1905.1 network configuration and security. In some implementations, the new Multi-AP Controller may perform both the message exchanges shown at 303-323 (for establishing IEEE 802.11 connectivity and security) and the message exchanges shown at 333-363 (for establishing IEEE 1905.1 network configuration and security).

Figure 4:
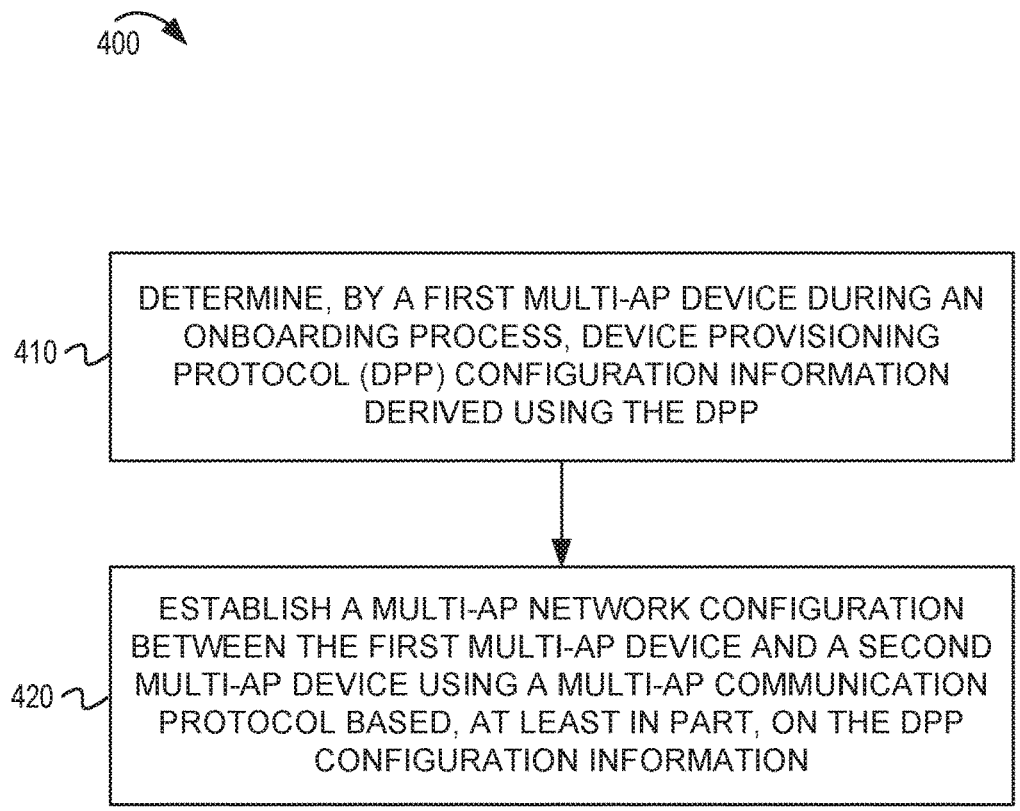
FIG. 4 shows an example flowchart for onboarding one or more Multi-AP devices using the DPP and a Multi-AP communication protocol.

FIG. 4 shows an example flowchart 400 for onboarding one or more Multi-AP devices using the DPP and a Multi-AP communication protocol.

At block 410, in some implementations, a first Multi-AP device may determine, during an onboarding process, DPP configuration information that was derived using the DPP. For example, the first Multi-AP device may be a Multi-AP Controller that is configured as the DPP configurator. In some implementations, the DPP configuration information may be derived using the DPP during a pre-onboarding process performed remotely by a network operator prior to deployment of the Multi-AP devices.

At block 420, a Multi-AP network configuration is established between the first Multi-AP device and a second Multi-AP device using a Multi-AP communication protocol based, at least in part, on the DPP configuration information. For example, the Multi-AP network configuration of the first Multi-AP device and the second Multi-AP device may be established using the DPP and the Multi-AP communication protocol, as described in FIGS. 1-3. In some implementations, the Multi-AP communication protocol includes an IEEE 1905.1 protocol. Also, the second Multi-AP device may be a Multi-AP Agent. In some implementations, the Multi-AP network configuration between the first Multi-AP device and the second Multi-AP device may be established using the Multi-AP communication protocol based on the DPP configuration information by preparing and exchanging IEEE 1905.1 messages that include one or more connectors associated with the configuration information to establish an IEEE 1905.1 configuration. In some implementations, the first Multi-AP device and the second Multi-AP device also may prepare and exchange IEEE 802.11 messages including the one or more connectors associated with the configuration information to establish an IEEE 802.11 connection between the first Multi-AP device and the second Multi-AP device.

Figure 5:
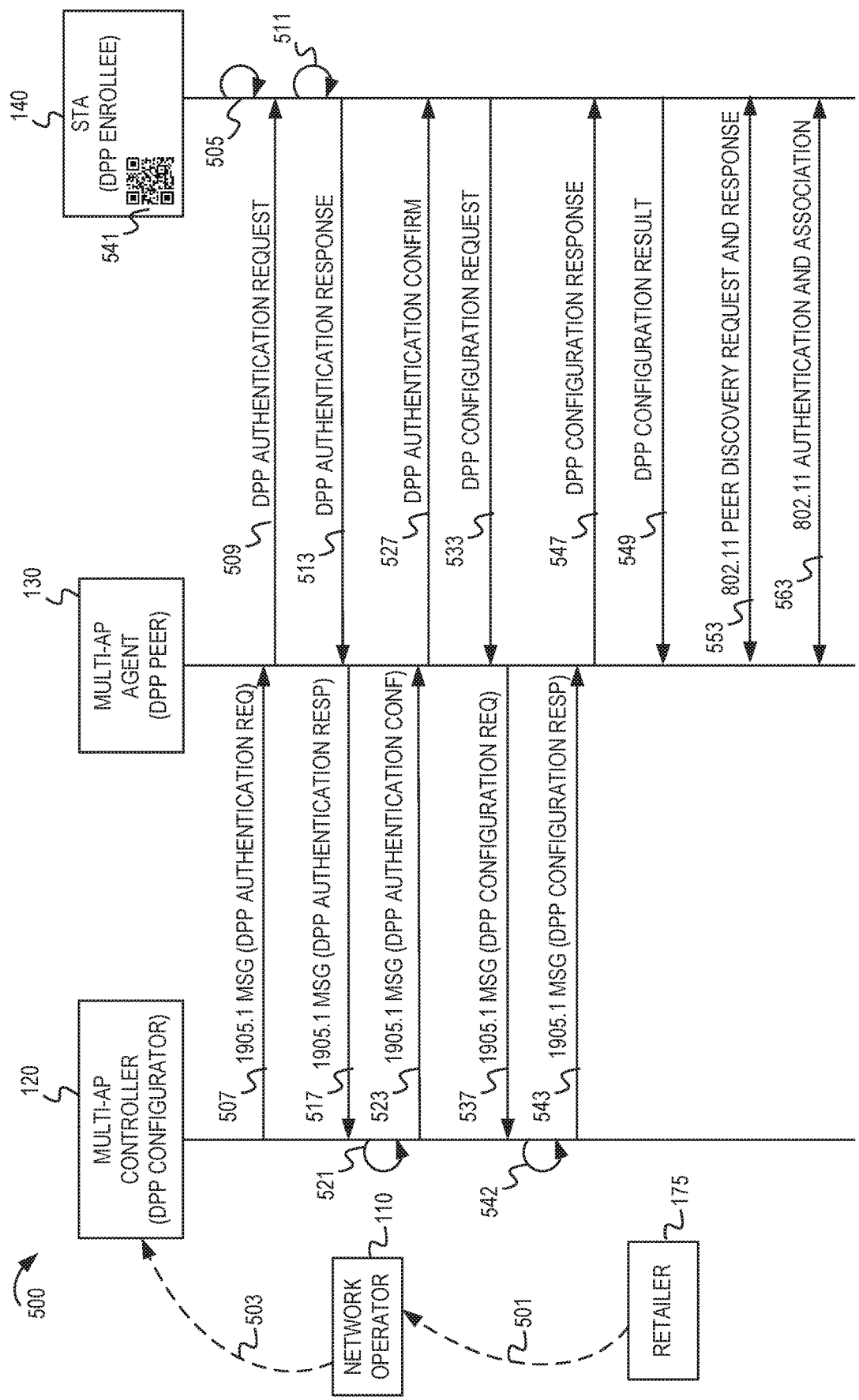
FIG. 5 shows an example message flow diagram of a station (STA) onboarding process using DPP bootstrap information obtained from a retailer.

FIG. 5 shows an example message flow diagram of a STA onboarding process using DPP bootstrap information obtained from a retailer. The message flow diagram 500 includes messages between the Multi-AP Controller 120 (configured as the DPP configurator), the Multi-AP Agent 130 (configured as a DPP peer after the DPP), and a STA 140 (configured as a DPP enrollee), and also messages from the retailer 175 and the network operator 110.

In some implementations, the retailer 175 (such as an online or physical retailer or other third-party entity) may remotely perform part of the DPP process to onboard a new STA (such as STA 140) in the Multi-AP Network (such as the network shown in FIG. 1). For example, a customer may buy or lease the STA 140 from the retailer 175 to add to the Multi-AP Network at the customer's home or office. The retailer 175 may perform part of the DPP process to obtain a public bootstrap key for the STA 140 prior to the retailer 175 shipping the STA 140 to the customer, or prior to the customer leaving the retailer 175 with the STA 140. For example, the retailer 175 may scan and decode a QR Code (such as QR Code 541) of the STA 140 to derive the public bootstrap key for the STA 140. The retailer 175 may securely transmit (such as via the Internet) the public bootstrap key to the network operator 110 (as shown at 501). The network operator 110 may then securely transmit the public bootstrap key to the Multi-AP Controller 120 that has been delegated as the DPP configurator (as shown at 503). In some implementations, the network operator 110 may be both the operator of the network and one of the retailers. For example, the network operator 110 may have physical or online retail stores (such as retailer 175) where customers can lease or purchase new devices (such as the STA 140) that can be added to the Multi-AP Network. Thus, in some implementations, the network operator 110 may perform part of the DDP process to obtain the pubic bootstrap key for the STA 140, and then may securely transmit the public bootstrap key to the Multi-AP controller 120.

After the STA 140 is deployed to the destination and the STA 140 is powered on, at 505, the STA 140 may wait to receive a DPP authentication request from the Multi-AP Controller 120 via the Multi-AP Agent 130. For example, when the Multi-AP Controller 120 receives the public bootstrap key (such as after the retailer 175 or the network operator 110 scans and decodes the QR code 541), this may trigger the Multi-AP Controller 120 to send the DPP authentication request to the STA 140. In some implementations, the STA 140, the Multi-AP Controller 120, and the Multi-AP Agent 130 may perform operations and exchange various messages to complete the DPP process and onboard the STA 140. In some implementations, when configured as the DPP configurator, the Multi-AP Controller 120 may communicate with each of the available Multi-AP Agents (DPP peers, such as the Multi-AP Agent 130) in the network to determine which of the Multi-AP Agents should communicate with the STA 140 for onboarding purposes. For example, the Multi-AP Controller 120 may attempt to communicate with the STA 140 via each of the Multi-AP Agents to determine through which path the Multi-AP Controller 120 receives a communication from the STA 140, or through which path the Multi-AP Controller 120 receives the fastest or highest quality response from the STA 140 (such as based on the wireless coverage of each Multi-AP Agent). In this example, the Multi-AP Controller 120 may determine to communicate with the STA 140 for onboarding purposes via the Multi-AP Agent 130 based on its wireless coverage.

In some implementations, at 507, the Multi-AP Controller 120 may send a DPP authentication request (which is intended for the STA 140) to the Multi-AP Agent 130 via an IEEE 1905.1 frame. The Multi-AP Controller 120 (which is configured as the DPP configurator) may tunnel the DPP authentication request to the Multi-AP Agent 130 via an IEEE 1905.1 frame when the Multi-AP Agent 130 is not configured as a DPP configurator and the Multi-AP Controller 120 does not have wireless connectivity with the STA 140 (or has a low quality wireless connection). For example, the Multi-AP Controller 120 may be out of range of the STA 140, or the Multi-AP Agent 130 may be located at a closer proximity to the STA 140 and have a high quality wireless connection with the STA 140. At 509, the Multi-AP Agent 130 may forward the DPP authentication request to the STA 140.

At 511, the STA 140 processes and verifies the DPP authentication request. For example, the STA 140 may verify that the DPP authentication request originated from a Multi-AP device that possesses the public bootstrap key (such as the public bootstrap key that was received from the retailer 175 via the network operator 110) to verify the DPP authentication request. At 513, the STA 140 may send a DPP authentication response to the Multi-AP Agent 130. At 517, the Multi-AP Agent 130 may tunnel an IEEE 1905.1 frame including the DPP authentication response to the Multi-AP Controller 120, which may indicate that the STA 140 verified the DPP authentication request. At 521, the Multi-AP Controller 120 may process and validate the DPP authentication response received from the STA 140 via the Multi-AP Agent 130. For example, the Multi-AP Controller 120 may use the public bootstrap key to validate the DPP authentication response. At 523, the Multi-AP Controller 120 may send a DPP authentication confirmation to the Multi-AP Agent 130 via an IEEE 1905.1 frame indicating the DPP authentication response was validated by the Multi-AP Controller 120. At 527, the Multi-AP Agent 130 may forward the DPP authentication confirmation to the STA 140.

At 533, the STA 140 may send a DPP configuration request to the Multi-AP Agent 130 to initiate the DPP configuration phase. At 537, the Multi-AP 130 may tunnel the DPP configuration request to the Multi-AP Controller 120 via an IEEE 1905.1 frame. At 542, the Multi-AP Controller 120 may process the DPP configuration request, and determine the DPP configuration information for the STA 140. At 543, the Multi-AP Controller 120 may send an IEEE 1905.1 frame including the DPP configuration response to the Multi-AP Agent 130 to provision the STA 140 with the DPP configuration information. At 547, the Multi-AP Agent 130 may forward the DPP configuration response to the STA 140, which includes the DPP configuration information. The DPP configuration information may include a configurator public verification key. At 549, after the DPP configuration is completed, the STA 140 may send a DPP configuration result to the Multi-AP Agent 130 to indicate the results of the DPP configuration and confirm that the DPP configuration was completed.

At 553, the Multi-AP Agent 130 and STA 140 may exchange Peer Discovery Request and Response frames. In some implementation, the STA 140 may transmit a Peer Discovery Request frame having the connector associated with the STA 140. The Multi-AP Agent 130 may receive the Peer Discovery Request frame having the connector and may verify the group identifier, the network role, and other information of the connector. The Multi-AP Agent 130 may respond to the STA 140 with a Peer Discovery Response frame having the connector associated with the Multi-AP Agent 130. The Peer Discovery Response frame may be digitally signed with the configurator private signing key.

The STA 140 may verify the digitally signed message with the configurator public verification key and verify the connector received from the Multi-AP Agent 130.

At 563, the STA 140 and the Multi-AP Agent 130 may perform IEEE 802.11 authentication and association processes to establish a secure wireless communication link (according to IEEE 802.11 protocols), and complete the onboarding process for the STA 140.

Figure 6:
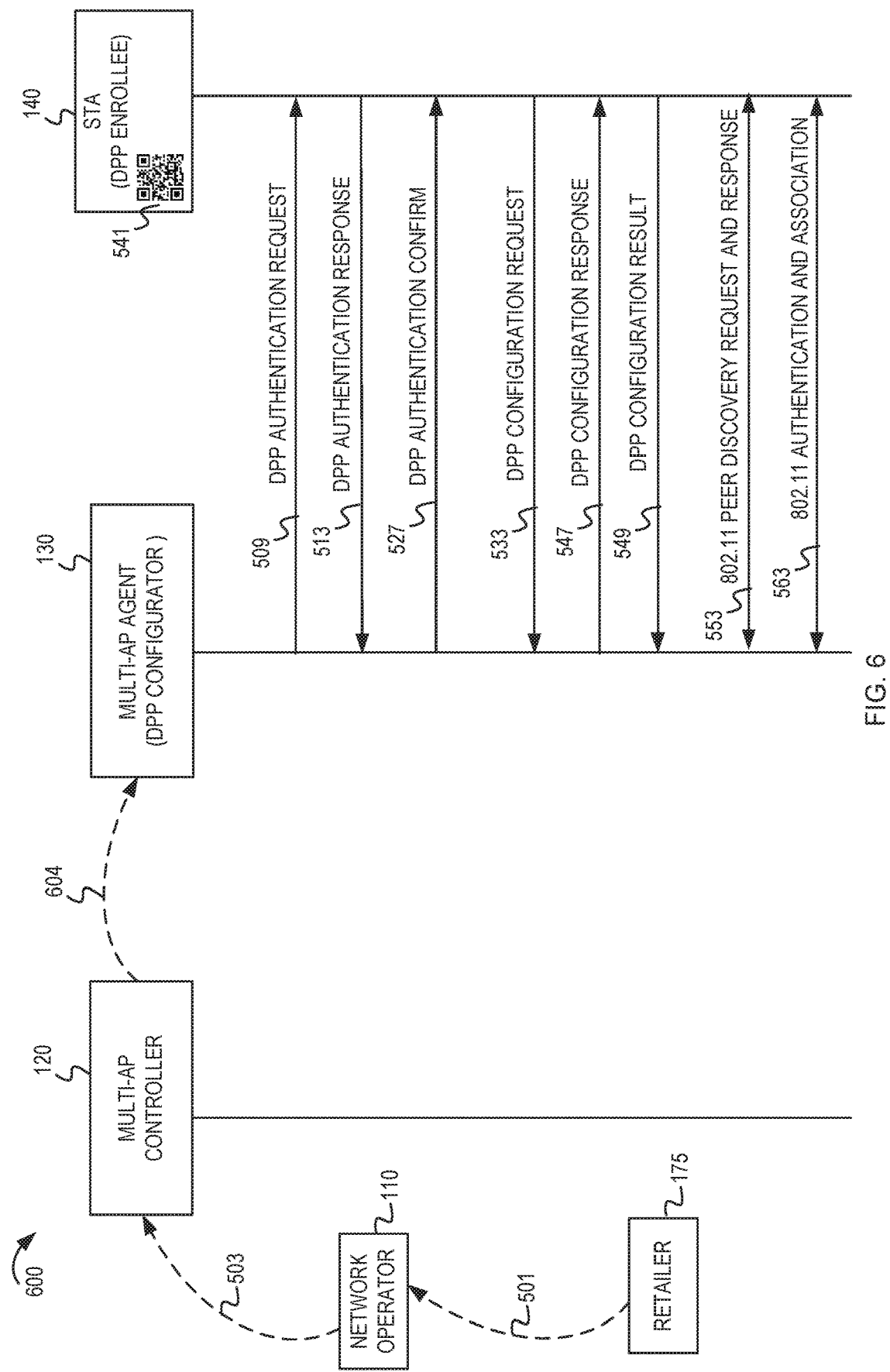
FIG. 6 shows another example message flow diagram of a STA onboarding process using DPP bootstrap information obtained from a retailer.

FIG. 6 shows another example message flow diagram 600 of a STA onboarding process using DPP bootstrap information obtained from a retailer.

Similar to FIG. 5, the retailer 175 may perform part of the DPP process to obtain a public bootstrap key for the STA 140. For example, the retailer 175 may scan and decode a QR Code (such as QR Code 541) of the STA 140 to derive the public bootstrap key for the STA 140. At 501, the retailer 175 may securely transmit (such as via the Internet) the public bootstrap key to the network operator 110. At 503, the network operator 110 may then securely transmit the public bootstrap key to the Multi-AP Controller 120. In some implementations, the network operator 110 may be both the operator of the network and one of the retailers. For example, the network operator 110 may have physical or online retail stores (such as retailer 175) where customers can lease or purchase new devices (such as the STA 140) that can be added to the Multi-AP Network.

At 604, which is different than FIG. 5, the Multi-AP Controller 120 delegates the DPP configurator role to Multi-AP Agent 130, and also provides the public bootstrap key to the Multi-AP Agent 130. Furthermore, in some implementations, when a device that is configured as the DPP configurator (such as the Multi-AP Controller 120) delegates the DPP configurator role to another device (such as the Multi-AP Agent 130), the Multi-AP Controller 120 may provide the configurator private signing key to the Multi-AP Agent 130 (in a secure envelope). Since the Multi-AP Agent 130 is configured as the DPP configurator in FIG. 6, the Multi-AP Agent does not have to tunnel the messages received from the STA 140 to the Multi-AP Controller 120 via IEEE 1905.1 frames (as in FIG. 5). Instead, in FIG. 6, the Multi-AP Agent 130 and the STA 140 perform the operations and message exchanges at 509, 513, 527, 533, 547, 549, 553, and 563 of FIG. 5 in order to onboard the STA 140.

Figure 7:
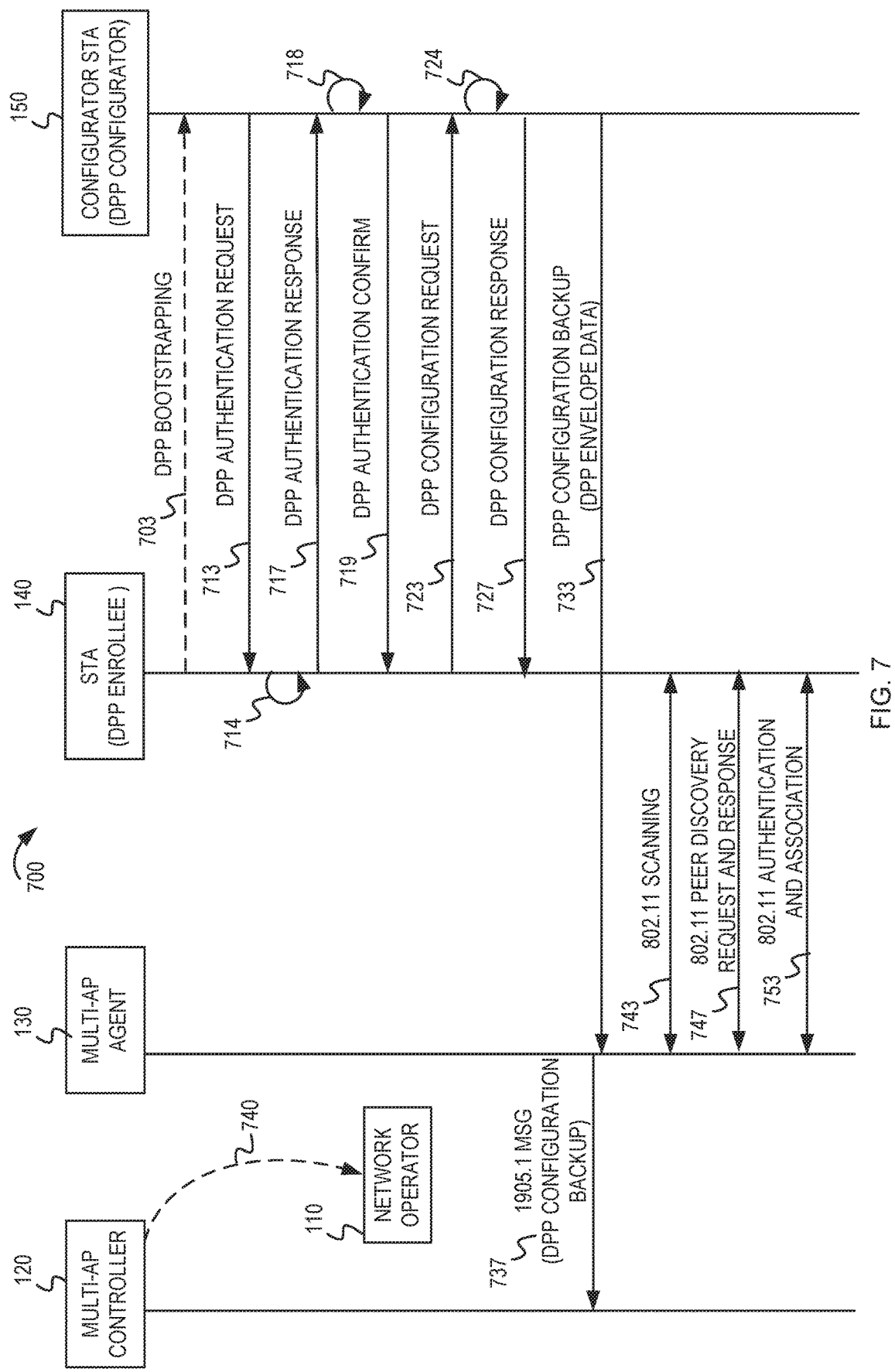
FIG. 7 shows an example message flow diagram of a STA onboarding process using a configurator STA that is delegated by the network operator as the DPP configurator.

FIG. 7 shows an example message flow diagram of a STA onboarding process using a configurator STA that is delegated by the network operator as the DPP configurator. The message flow diagram 700 includes messages between the configurator STA 150 (configured as the DPP configurator), the STA 140 (configured as a DPP enrollee), Multi-AP Controller 120, and the Multi-AP Agent 130, and also messages to the network operator 110.

In some implementations, the network operator 110 (or the Multi-AP Controller 120) may delegate the DPP configurator role to a configurator STA (or to an operator-approved configurator application that is downloadable to the STA), such as configurator STA 150, which can be used by the user of the Multi-AP Network to onboard a new STA (such as STA 140) into the Multi-AP Network. The network operator 110 may supply the user the configurator STA 150 that is pre-loaded with a configurator application (or pre-configured as the DPP configurator), or the network operator 110 may provide a downloadable configurator application that the user can download to the configurator STA 150 to configure the configurator STA 150 as the DPP configurator. Furthermore, in some implementations, when the network operator 110 (or the Multi-AP Controller 120) delegates the DPP configurator role to the configurator STA 150, the network operator 110 (or the Multi-AP Controller 120) may provide the configurator private signing key to the configurator STA 150 (in a secure envelope). The user may use the configurator STA 150 to begin the onboarding process of the STA 140 by performing the DPP, as described in FIG. 2.

In some implementations, after the STA 140 is deployed at the destination and is powered on, at 703, the configurator STA 150 may obtain the public bootstrap key from the STA 140. For example, the configurator STA 150 may scan and decode a QR Code of the STA 140 to derive the public bootstrap key for the STA 140.

At 713, the configurator STA 150 may send a DPP authentication request to the STA 140. At 714, the STA 140 processes and verifies the DPP authentication request received from the configurator 150. For example, the STA 140 may verify the DPP authentication request using the public bootstrap key that was received from the configurator 150. At 717, the STA 140 may send the DPP authentication response to the configurator STA 150. The DPP authentication response may indicate that the STA 140 verified the DPP authentication request. At 718, the configurator STA 150 may validate the DPP authentication response received from the STA 140, and, at 719, may send a DPP authentication confirmation to the STA 140 indicating the DPP authentication response was validated by the configurator STA 150.

At 723, the STA 140 may send a DPP configuration request to the configurator STA 150 to initiate the DPP configuration phase. At 724, the configurator STA 150 may process the DPP configuration request, and determine the DPP configuration information associated with the configurator STA 150. At 727, the configurator STA 150 may send the DPP configuration response to the STA 140, which includes the DPP configuration information. The DPP configuration information may include a configurator public verification key.

At 733, the configurator STA 150 may provide a backup of the DPP configuration information (including DPP envelope data) derived during the onboarding process to the Multi-AP Agent 130. At 737, the Multi-AP Agent 130 may provide an IEEE 1905.1 message including the DPP configuration information (with the DPP envelope data) to the Multi-AP Controller 120. At 740, the Multi-AP Controller 120 may then provide the DPP configuration information (with the DPP envelope data) to the network operator 110.

At 743, the STA 140 may perform IEEE 802.11 scanning to identify one of the Multi-AP devices of the Multi-AP Network. For example, the STA 140 may broadcast a probe request message and scan for beacon messages. The STA 140 may identify the Multi-AP Agent 130 based on the scanning operation. For example, the STA 140 may receive a probe response message or a beacon message from the Multi-AP Agent 130. At 747, the Multi-AP Agent 130 and the STA 140 may exchange Peer Discovery Request and Response frames in order to verify the connectors. At 753, the STA 140 and the Multi-AP Agent 130 may perform IEEE 802.11 authentication and association processes to establish a secure wireless communication link (according to IEEE 802.11 protocols), and complete the onboarding process for the STA 140.

Figure 8:
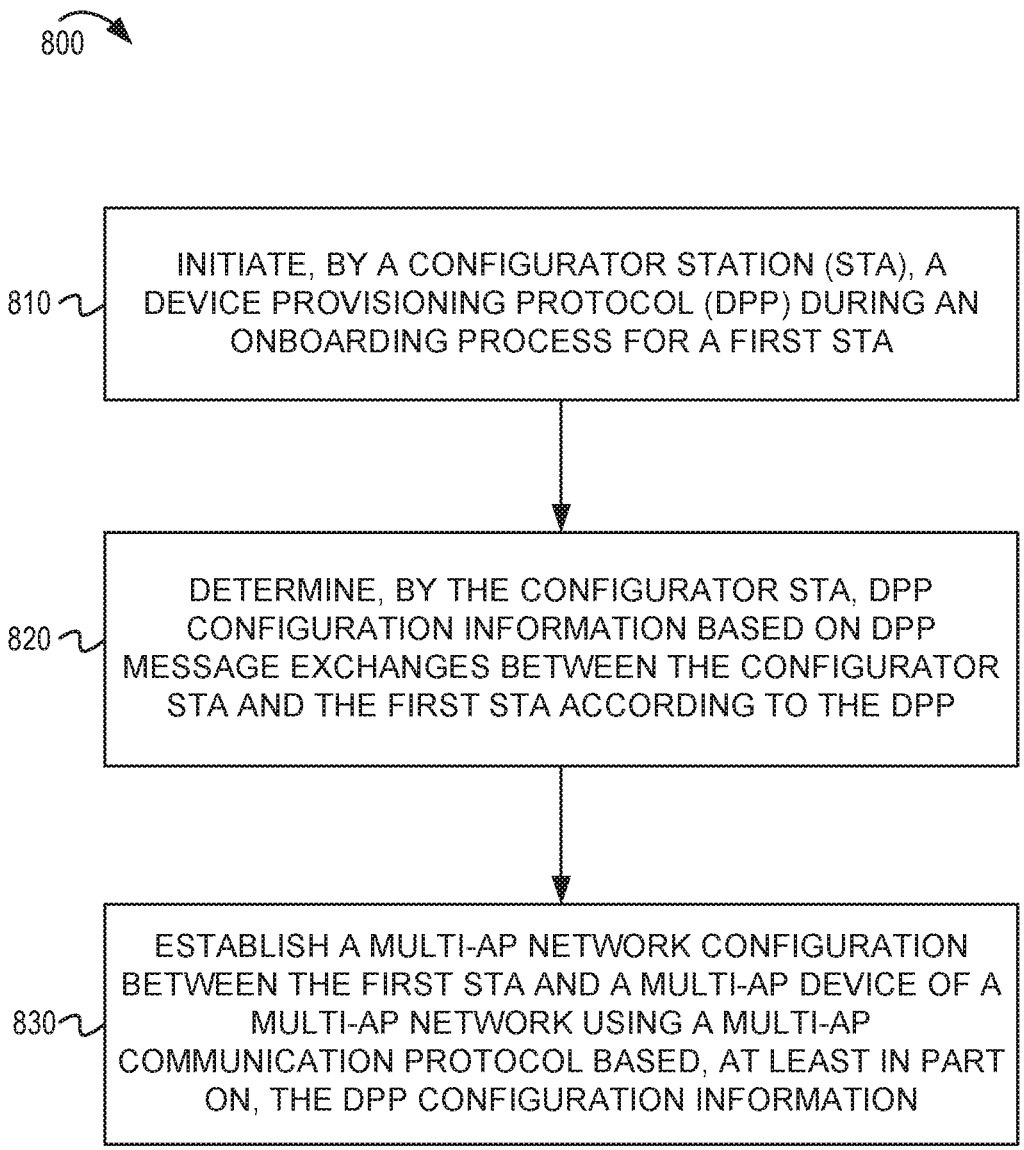
FIG. 8 shows an example flowchart for onboarding a first STA using the DPP and a Multi-AP communication protocol.

FIG. 8 shows an example flowchart 800 for onboarding a first STA using the DPP and a Multi-AP communication protocol.

At block 810, a configurator STA may initiate the DPP during an onboarding process for the first STA. For example, the configurator STA may initiate the DPP by scanning a QR Code of the first STA to obtain a bootstrap key. In some implementations, the configurator STA may be a STA that is delegated the DPP configurator role by the network.

At block 820, the configurator STA may determine the DPP configuration information based on DPP message exchanges between the configurator STA and the first STA according to the DPP.

At block 830, a Multi-AP network configuration between the first STA and a Multi-AP device of a Multi-AP network is established using the Multi-AP communication protocol based, at least in part, on the DPP configuration information. In some implementations, the Multi-AP communication protocol includes an IEEE 1905.1 protocol. Also, the Multi-AP device may be a Multi-AP Controller or a Multi-AP Agent.

Figure 9:
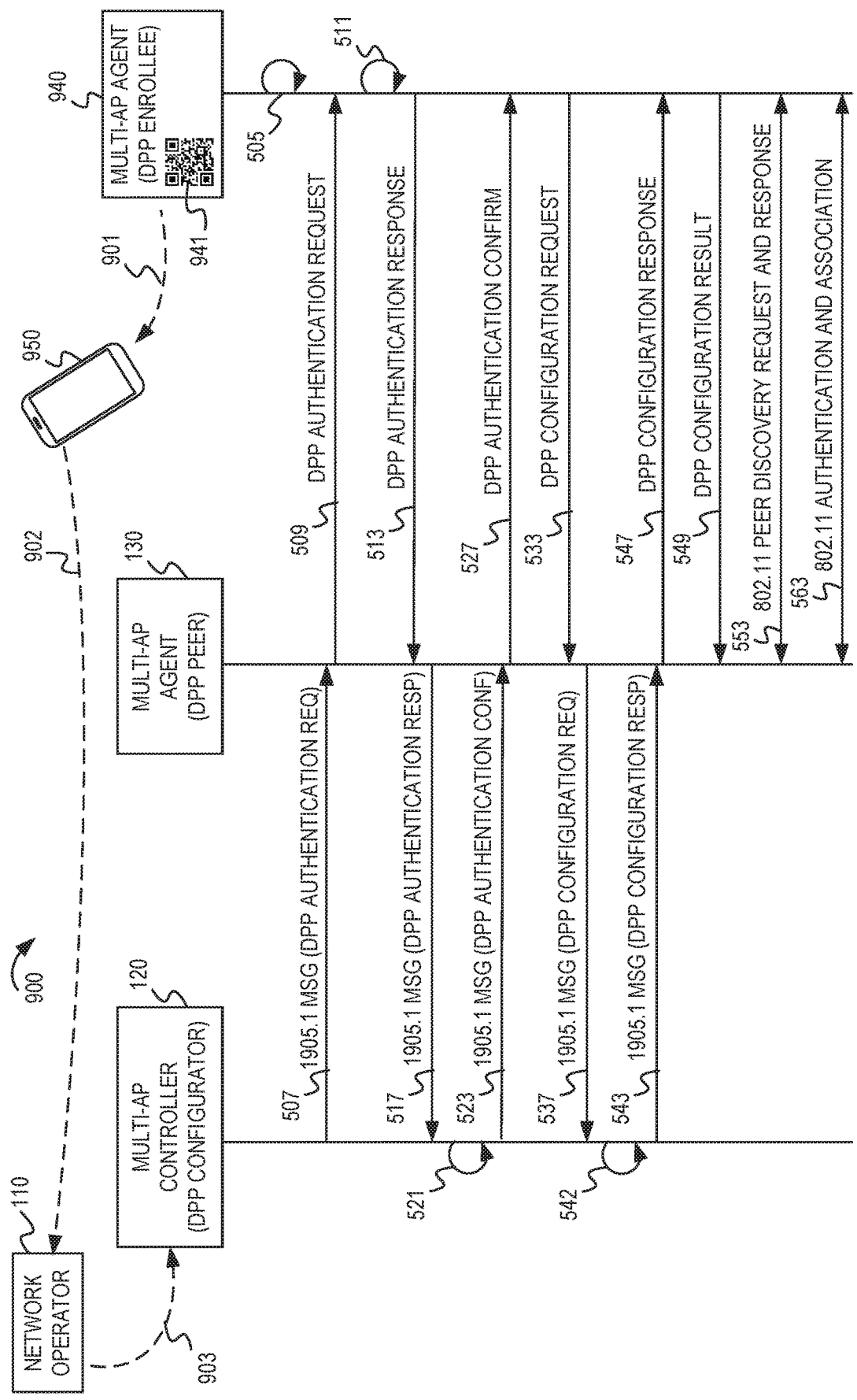
FIG. 9 shows an example message flow diagram of a Multi-AP Agent onboarding process.

FIG. 9 shows an example message flow diagram of a Multi-AP Agent onboarding process. The message flow diagram 900 includes messages between the Multi-AP Controller 120 (configured as the DPP configurator), the Multi-AP Agent 130 (configured as a DPP peer), a Multi-AP Agent 940 (configured as a DPP enrollee), a STA 950, and the network operator 110.

In some implementations, a customer may buy or lease the Multi-AP Agent 940 directly from the network operator 110 or from a retailer (such as an online or physical retailer, which may be run by the network operator 110 or may be a third-party entity) to add the Multi-AP Agent 940 to the Multi-AP Network at the customer's home, office, or other destination. The customer may use the STA 950 (which may be a mobile phone, tablet computer, or other device, such as the configurator STA 150 described in FIGS. 1 and 7) to perform part of the DPP process to obtain a public bootstrap key for the Multi-AP Agent 940. For example, the STA 950 may scan and decode a QR Code (such as QR Code 941) of the Multi-AP Agent 940 to derive the public bootstrap key for the Multi-AP Agent 940 (shown at 901). The STA 950 may securely transmit (such as via the Internet) the public bootstrap key to the network operator 110 (as shown at 902). In some implementations, the customer may use the STA 950 to access a web application provided by the network operator 110 or download an operator-approved application to perform part of the DPP process and provide the public bootstrap key to the network operator 110. The network operator 110 may then securely transmit the public bootstrap key to the Multi-AP Controller 120 that has been delegated as the DPP configurator (as shown at 903). In some implementations, similar to the operations described in FIG. 5, the retailer or the network operator 110 may remotely perform part of the DPP process to obtain the public bootstrap key for the Multi-AP Agent 940. For example, the retailer or the network operator 110 may perform part of the DPP process prior to the retailer or the network operator shipping the Multi-AP Agent 940 to the customer (or prior to the customer leaving a physical store of the retailer or network operator 110 with the Multi-AP Agent 940). The public bootstrap key may then be securely transmitted to the Multi-AP Controller 120, either from the retailer or network operator 110 directly to the Multi-AP Controller 120, or from the retailer to the Multi-AP Controller 120 via the network operator 110.

When the Multi-AP Agent 940 is powered on at the customer's home, office, or other destination, at 505, the Multi-AP Agent 940 may wait to receive a DPP authentication request from the Multi-AP Controller 120 via the Multi-AP Agent 130. For example, when the Multi-AP Controller 120 receives the public bootstrap key (such as after the STA 950 scans and decodes the QR code 941), this may be trigger the Multi-AP Controller 120 to send the DPP authentication request to the Multi-AP Agent 940. In some implementations, the Multi-AP Agent 940, the Multi-AP Controller 120, and the Multi-AP Agent 130 may perform operations and exchange various messages to complete the DPP process and onboard the Multi-AP Agent 940. In some implementations, when configured as the DPP configurator, the Multi-AP Controller 120 may communicate with each of the available Multi-AP Agents (DPP peers, such as the Multi-AP Agent 130) in the network to determine which of the Multi-AP Agents should communicate with the Multi-AP Agent 940 for onboarding purposes. For example, the Multi-AP Controller 120 may attempt to communicate with the Multi-AP Agent 940 via each of the Multi-AP Agents to determine through which path the Multi-AP Controller 120 receives a communication from the Multi-AP Agent 940, or through which path the Multi-AP Controller 120 receives the fastest or highest quality response from the Multi-AP Agent 940 (such as based on the wireless coverage of each Multi-AP Agent). In this example, the Multi-AP Controller 120 may determine to communicate with the Multi-AP Agent 940 for onboarding purposes via the Multi-AP Agent 130 based on its the wireless coverage.

In some implementations, at 507, the Multi-AP Controller 120 may send a DPP authentication request (which is intended for the Multi-AP Agent 940) to the Multi-AP Agent 130 via an IEEE 1905.1 frame. The Multi-AP Controller 120 (which is configured as the DPP configurator) may tunnel the DPP authentication request to the Multi-AP Agent 130 via an IEEE 1905.1 frame when the Multi-AP Agent 130 is not configured as a DPP configurator and the Multi-AP Controller 120 does not have wireless connectivity with the Multi-AP Agent 940 (or has a low quality wireless connection). For example, the Multi-AP Controller 120 may be out of range of the Multi-AP Agent 940, or the Multi-AP Agent 130 may be located at a closer proximity to the Multi-AP Agent 940 and have a high quality wireless connection with the Multi-AP Agent 940.

At 509, the Multi-AP Agent 130 may send the DPP authentication request to the Multi-AP Agent 940. At 511, the Multi-AP Agent 940 processes and verifies the DPP authentication request. For example, the Multi-AP Agent 940 may verify that the DPP authentication request originated from a Multi-AP device that possesses the public bootstrap key. At 513, the Multi-AP Agent 940 may send a DPP authentication response to the Multi-AP Agent 930. At 517, the Multi-AP Agent 130 may tunnel an IEEE 1905.1 frame including the DPP authentication response to the Multi-AP Controller 120. At 521, the Multi-AP Controller 120 may process and validate the DPP authentication response received from the Multi-AP Agent 940 via the Multi-AP Agent 130. For example, the Multi-AP Controller 120 may use the public bootstrap key that was received from the STA 950 via the network operator 110 to validate the DPP authentication response. At 523, the Multi-AP Controller 120 may send a DPP authentication confirmation to the Multi-AP Agent 130 via an IEEE 1905.1 frame indicating the Multi-AP Controller 120 validated the DPP authentication response. At 527, the Multi-AP Agent 130 may send the DPP authentication confirmation to the Multi-AP Agent 940.

At 533, the Multi-AP Agent 940 may send a DPP configuration request to the Multi-AP Agent 130 to initiate the DPP configuration phase. At 537, the Multi-AP 130 may tunnel the DPP configuration request to the Multi-AP Controller 120 via an IEEE 1905.1 frame. At 542, the Multi-AP Controller 120 may process the DPP configuration request, and determine the DPP configuration information for the Multi-AP Agent 940. At 543, the Multi-AP Controller 120 may send an IEEE 1905.1 frame including the DPP configuration response to the Multi-AP Agent 130 to provision the Multi-AP Agent 940 with the DPP configuration information. At 547, the Multi-AP Agent 130 may forward the DPP configuration response to the Multi-AP Agent 940, which includes the DPP configuration information. The DPP configuration information may include a configurator public verification key. At 549, after the DPP configuration is completed, the Multi-AP Agent 940 may send a DPP configuration result to the Multi-AP Agent 130 to indicate the results of the DPP configuration and confirm that the DPP configuration was completed.

At 553, the Multi-AP Agent 130 and the Multi-AP Agent 940 may exchange Peer Discovery Request and Response frames. In some implementation, the Multi-AP Agent 940 may transmit a Peer Discovery Request frame having the connector associated with the Multi-AP Agent 940. The Multi-AP Agent 130 may receive the Peer Discovery Request frame having the connector and may verify the group identifier, the network role, and other information of the connector. The Multi-AP Agent 130 may respond to the Multi-AP Agent 940 with a Peer Discovery Response frame having the connector associated with the Multi-AP Agent 130. The Peer Discovery Response frame may be digitally signed with the configurator private signing key. The Multi-AP Agent 940 may verify the digitally signed message with the configurator public verification key and verify the connector received from the Multi-AP Agent 130. At 563, the Multi-AP Agent 940 and the Multi-AP Agent 130 may perform IEEE 802.11 authentication and association processes to establish a secure wireless communication link (according to IEEE 802.11 protocols), and complete the onboarding process for the Multi-AP Agent 940.

In some implementations, the Multi-AP Controller 120 may delegate the DPP configurator role to the Multi-AP Agent 130, and also provide the public bootstrap key to the Multi-AP Agent 130. When the Multi-AP Controller 120 (or another device that is configured as the DPP configurator) delegates the DPP configurator role to the Multi-AP Agent 130, the Multi-AP Controller 120 may provide the configurator private signing key to the Multi-AP Agent 130 (in a secure envelope). Similar to the operations and message exchanges shown in FIG. 6, when the Multi-AP Agent 130 is configured as the DPP configurator, the Multi-AP Agent 130 does not have to tunnel the messages received from the Multi-AP Agent 940 to the Multi-AP Controller 120 via IEEE 1905.1 frames (as in FIGS. 5 and 9). Instead, the Multi-AP Agent 130 and the Multi-AP Agent 940 may perform the operations and message exchanges similar to the operations and message exchanges shown at 509, 513, 527, 533, 547, 549, 553, and 563 of FIG. 9 in order to onboard the Multi-AP Agent 940.

Figure 10:
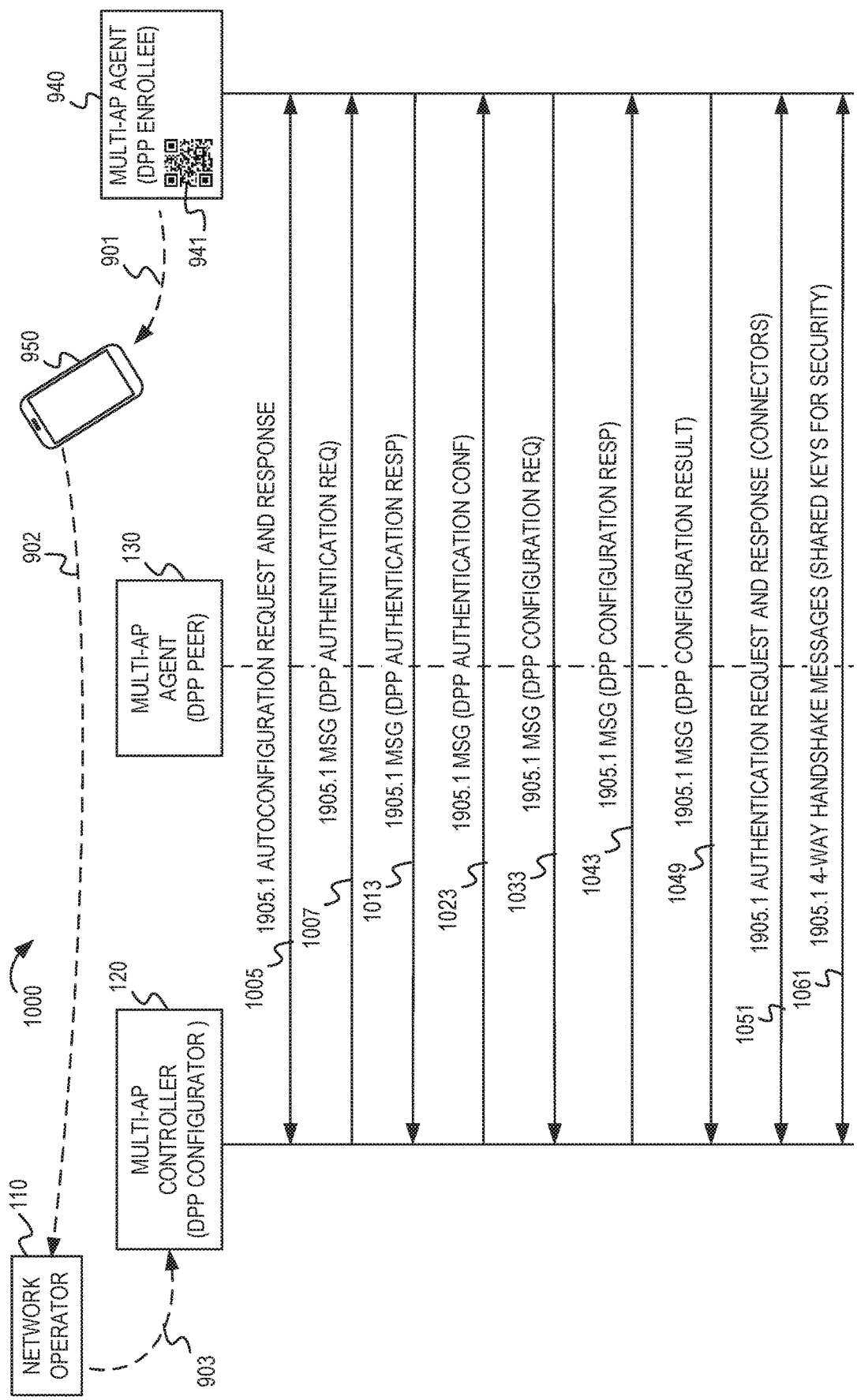
FIG. 10 shows another example message flow diagram of a Multi-AP Agent onboarding process.

FIG. 10 shows another example message flow diagram 1000 of a Multi-AP Agent onboarding process. Similar to FIG. 9, part of the DPP process may be performed at 901, 902, and 903 for the Multi-AP Controller 120 to obtain a public bootstrap key for the Multi-AP Agent 940. In some implementations, to add the Multi-AP Agent 940 to the Multi-AP Network, the customer (or a network administrator, installer, or user) may physically connect the Multi-AP Agent 940 to the Multi-AP Agent 130 (or to the Multi-AP Controller 120) via a wired connection, such as via an Ethernet cable, to establish an Ethernet link when the Multi-AP Agent 940 is powered on. In some implementations, when the Multi-AP Agent 940 and the Multi-AP Agent 130 are connected via an Ethernet link, the onboarding process may perform similar DPP operations and message exchanges as shown at 507-549 of FIG. 9 and the IEEE 1905.1 operations and message exchanges shown in FIG. 3, except the Multi-AP Agent 130 may act as a relay without performing extra decapsulation and encapsulation at the 1905 layer (as shown in FIG. 10).

In some implementations, at 1005 of FIG. 10, the Multi-AP Agent 130 and the Multi-AP Agent 940 may exchange IEEE 1905.1 AutoConfiguration Request and Response frames for the Multi-AP devices to discover each other via IEEE 1905.1 protocols. At 1007, the Multi-AP Controller 120 may send an IEEE 1905.1 message including a DPP authentication request to the Multi-AP Agent 940 (via the Multi-AP Agent 130, which acts as a bridge or relay). At 1013, the Multi-AP Agent 940 may send an IEEE 1905.1 message including a DPP authentication response to the Multi-AP Controller 120 (via the Multi-AP Agent 130). At 1023, the Multi-AP Controller 120 may send an IEEE 1905.1 message including a DPP authentication confirmation to the Multi-AP Agent 940 (via the Multi-AP Agent 130). At 1033, the Multi-AP Agent 940 may send an IEEE 1905.1 message including a DPP configuration request to the Multi-AP Controller 120 (via the Multi-AP Agent 130). At 1043, the Multi-AP Controller 120 may send an IEEE 1905.1 message including a DPP configuration response to the Multi-AP Agent 940 (via the Multi-AP Agent 130). At 1049, the Multi-AP Agent 940 may send an IEEE 1905.1 message including a DPP configuration result to the Multi-AP Controller 120 (via the Multi-AP Agent 130).

In some implementations, at 1051, the Multi-AP Controller 120 and the Multi-AP Agent 940 also may exchange IEEE 1905.1 Authentication Request and Response frames to exchange connectors in order to verify each other and the network connections via the IEEE 1905.1 protocols. At 1061, the Multi-AP Controller 120 and the Multi-AP Agent 940 may perform an IEEE 1905.1 4-way handshake for establishing IEEE 1905.1 configuration and security. For example, the 4-way handshake may be used to derive and deploy shared secrets or keys for use in IEEE 1905.1 control messages for security. After the 4-way handshake, the onboarding process may be completed, and the Multi-AP Controller 120 and the Multi-AP Agent 940 can communicate by exchanging secure 1905.1 messages.

Figure 11:
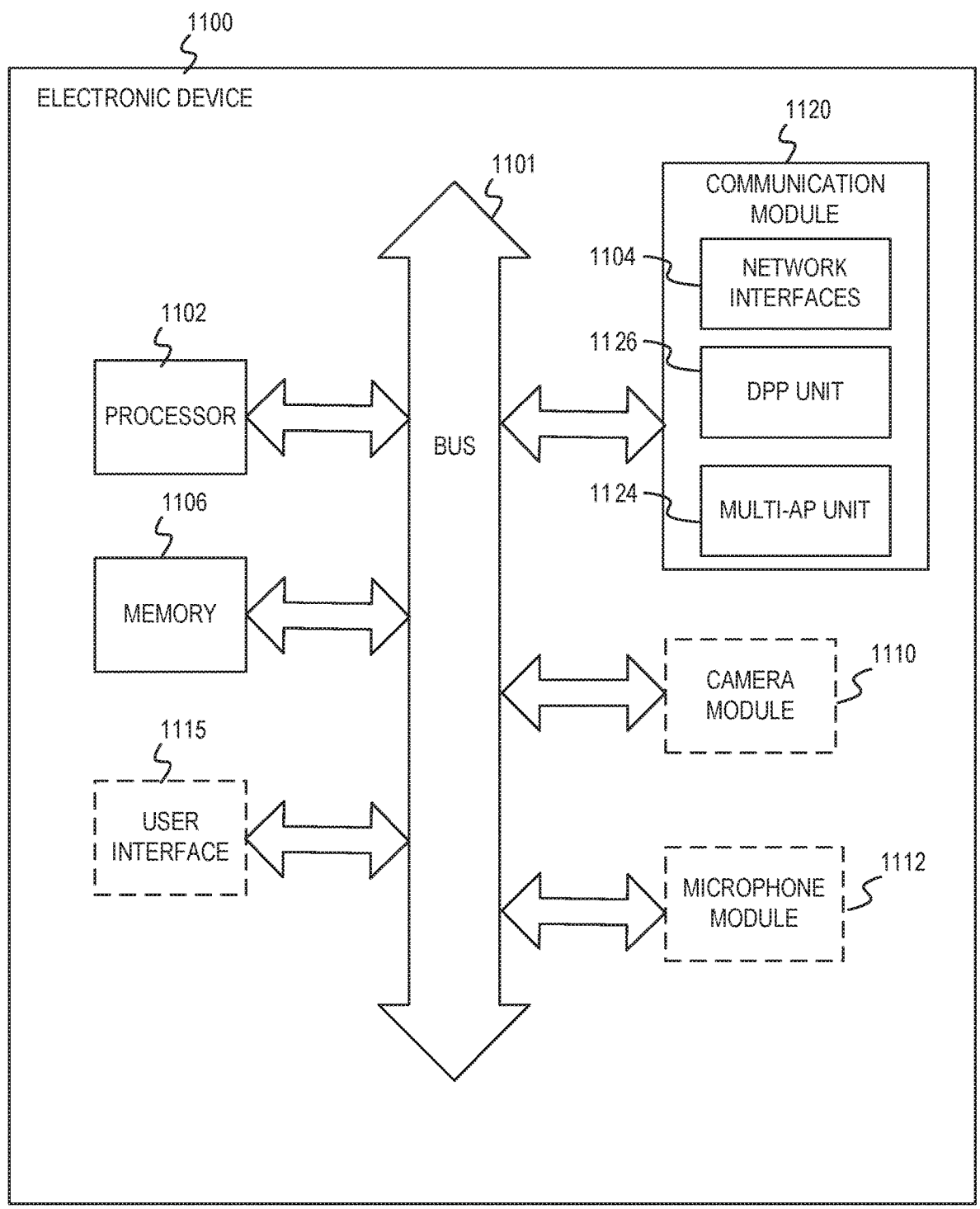
FIG. 11 shows a block diagram of an example electronic device for implementing aspects of this disclosure.

FIG. 11 shows a block diagram of an example electronic device 1100 for implementing aspects of this disclosure. In some implementations, the electronic device 1100 may be a Multi-AP Controller, a Multi-AP Agent, a STA, or another network device. The electronic device 1100 may be a laptop computer, a tablet computer, a mobile phone, a gaming console, a wearable device, a virtual or augmented reality device, an access point, a router, a gateway, or other electronic system. The electronic device 1100 includes a processor 1102 (possibly including multiple processors, multiple cores, multiple nodes, or implementing multi-threading, etc.). The electronic device 1100 includes a memory 1106. The memory 1106 may be system memory or any one or more of the possible realizations of machine-readable media described in this document. The electronic device 1100 also may include a bus 1101 (such as PCI, ISA, PCI-Express, HyperTransport®, InfiniBand®, NuBus®, AHB, AXI, etc.). The electronic device may include one or more network interfaces 1104, which may be a wireless network interface (such as a WLAN interface, a Bluetooth® interface, an LTE interface, a WiMAX® interface, a Zig-Bee® interface, a Wireless USB interface, etc.) or a wired network interface (such as a powerline communication (PLC) interface, an Ethernet interface, etc.). In some implementations, electronic device 1100 may support multiple network interfaces 1104—each of which may be configured to couple the electronic device 1100 to a different communication network.

The electronic device 1100 may include a communication module 1120. In some implementations, the communication module 1120 may include the one or more network interfaces 1104. In some implementations, the one or more network interfaces 1104 may be representative of the one or more modems, one or more antennas, analog front end (AFE), and other communication-related components of the electronic device 1100. The communication module 1120 may include the DPP unit 1126 and the Multi-AP unit 1124, which may implement the onboarding techniques described in FIGS. 1-10.

The memory 1106 includes functionality to support various implementations. The memory 1106 can include computer instructions executable by the processor 1102 to implement the functionality of the implementations described in FIGS. 1-10. For example, the memory 1106 may include one or more functionalities that facilitate implementation of the onboarding techniques described in FIGS. 1-10. In some implementations, the communication module 1120 may perform some or all of the operations described herein. For example, the communication module 1120 may include an additional processor (such as a baseband processor) and additional memory that may include computer instructions executable by the additional processor to implement some or all of the functionality of the implementations described in FIGS. 1-10. In some implementations, the additional processor(s) and memory of the communication module 1120, the processor 1102 and the memory 1106, or a combination of some or all of these components can implement the DPP unit 1126 and the Multi-AP unit 1124. In some implementations, the electronic device 1100 also may include additional components, such as a camera module 1110, a microphone module 1112, a user interface 1115, and other input/output components. For example, if the electronic device 1100 is a STA or is a device that is operating as an AP (such as a software enabled AP or "SoftAP"), the STA may include the camera module 1110, the microphone module 1112, and the user interface 1115. A dedicated or stand-alone AP may include some version of the user interface 1115, but may not include the camera module 1110 or the microphone module 1112. In some implementations, camera module 1110 and the microphone module 1112 may operate as sensors (such as a QR code sensor). The electronic device may include additional sensors, such as an NFC detector, a bar code scanner, etc.

Any one of these functionalities may be partially (or entirely) implemented in hardware, such as on the processor 1102. For example, the functionality may be implemented with an application specific integrated circuit, in logic implemented in the processor 1102, in a co-processor on a peripheral device or card, etc. Further, realizations may include fewer or additional components not illustrated in FIG. 11 (such as video cards, audio cards, additional network interfaces, peripheral devices, etc.). The processor 1102, and the memory 1106, may be coupled to the bus 1101. Although illustrated as being coupled to the bus 1101, the memory 1106 may be directly coupled to the processor 1102.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout this document. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a first Multi-AP device for onboarding one or more Multi-AP devices using a device provisioning protocol (DPP) and a Multi-AP communication protocol, comprising:

determining, during an onboarding process, DPP configuration information derived using the DPP;

establishing a Multi-AP network configuration between the first Multi-AP device and a second Multi-AP device using the Multi-AP communication protocol based, at least in part, on the DPP configuration information, wherein the DPP configuration information is tunneled via a frame associated with the Multi-AP communication protocol; and onboarding the second Multi-AP device into a Multi-AP Network associated with the Multi-AP network configuration in accordance with establishing the Multi-AP network using the Multi-AP communication protocol and the DPP configuration information.

2. The method of claim 1, wherein the DPP configuration information being derived using the DPP during a pre-onboarding process performed remotely by a network operator prior to deployment.

3. The method of claim 1, wherein:
the first Multi-AP device is a Multi-AP Controller configured as a DPP configurator, and the second Multi-AP device is a Multi-AP Agent configured as a DPP enrollee or peer, or
the first Multi-AP device is a first Multi-AP Agent configured as a DPP configurator, and the second Multi-AP device is a second Multi-AP Agent configured as a DPP enrollee or peer.

4. The method of claim 1, wherein establishing the Multi-AP network configuration between the first Multi-AP device and the second Multi-AP device using the Multi-AP communication protocol based, at least in part, on the DPP configuration information includes exchanging messages associated with the Multi-AP communication protocol that include one or more connectors derived using the DPP.

5. The method of claim 4, wherein each of the one or more connectors includes a tuple of a group identifier, a network role, and a network access provisioning key.

6. The method of claim 1, further comprising:
determining a connector associated with the first Multi-AP device;
generating an IEEE 802.11 message including the connector;
digitally signing at least a portion of the IEEE 802.11 message including the connector with a configurator private signing key; and
providing the digitally signed IEEE 802.11 message to the second Multi-AP device for verification of the connector using a configurator public verification key.

7. The method of claim 1, further comprising:
determining a connector associated with the first Multi-AP device;
generating an IEEE 1905.1 message including the connector;
digitally signing at least a portion of the IEEE 1905.1 message including the connector with a configurator private signing key; and
providing the digitally signed IEEE 1905.1 message to the second Multi-AP device for verification of the connector using a configurator public verification key.

8. The method of claim 1, further comprising:
receiving, from a network operator, a bootstrap key associated with a network device being onboarded into the Multi-AP Network; and
authenticating and configuring the network device using the DPP based, at least in part, on the bootstrap key received from the network operator.

9. The method of claim 8, wherein:
the network device is a station (STA) or Multi-AP Agent being onboarded into the Multi-AP Network, and
the bootstrap key is determined by the network operator after performing part of the DPP remotely prior to deployment of the STA or the Multi-AP Agent.

10. The method of claim 8, wherein:
the network device is a Multi-AP Agent being onboarded into the Multi-AP Network, and
the bootstrap key is received from a STA via the network operator, the bootstrap key determined by the STA after performing part of the DPP.

11. The method of claim 8, further comprising:
providing, by the first Multi-AP device, a DPP authentication request to the network device, the DPP authentication request tunneled via at least a first IEEE 1905.1 message by the second Multi-AP device to the network device for authentication;
receiving, by the first Multi-AP device, a DPP authentication response tunneled via at least a second IEEE 1905.1 message by the second Multi-AP device from the network device; and
validating the DPP authentication response received from the network device based, at least in part, on the bootstrap key.

12. The method of claim 8, further comprising:
receiving, by the first Multi-AP device, a DPP configuration request tunneled via at least a first IEEE 1905.1 message by the second Multi-AP device from the network device for configuring the network device into the Multi-AP Network;
configuring the network device based, at least in part, on the DPP configuration request; and
providing a DPP configuration response to the network device, the DPP configuration response tunneled via at least a second IEEE 1905.1 message by the second Multi-AP device.

13. A method for onboarding a first station (STA) using a device provisioning protocol (DPP) and a Multi-AP communication protocol, comprising:
initiating, by a configurator STA, the DPP during an onboarding process for the first STA;
determining, by the configurator STA, DPP configuration information based on DPP message exchanges between the configurator STA and the first STA according to the DPP; and
establishing a Multi-AP network configuration between the first STA and a Multi-AP device of a Multi-AP network using the Multi-AP communication protocol based, at least in part, on the DPP configuration information, wherein the Multi-AP communication protocol includes an IEEE 1905.1 protocol, and establishing the Multi-AP network configuration between the first STA and the Multi-AP device using the Multi-AP communication protocol based, at least in part, on the DPP configuration information includes tunneling the DPP configuration information via an IEEE 1905.1 frame, wherein the DPP configuration information includes one or more connectors derived using the DPP to establish an IEEE 1905.1 configuration.

14. The method of claim 13, further comprising providing the DPP configuration information to the Multi-AP device, wherein the Multi-AP device to store the DPP configuration information and provide the DPP configuration information to a network operator.

15. The method of claim 13, wherein the configurator STA is configured as a DPP configurator, the first STA is configured as a DPP enrollee, and the Multi-AP device is a Multi-AP Controller or a Multi-AP Agent.

16. A first Multi-AP device configured to onboard at least a second Multi-AP device using a device provisioning protocol (DPP) and a Multi-AP communication protocol, comprising:
means for determining, during an onboarding process, DPP configuration information derived using the DPP;
means for establishing a Multi-AP network configuration between the first Multi-AP device and the second Multi-AP device using the Multi-AP communication protocol based, at least in part, on the DPP configuration information, wherein the DPP configuration information is tunneled via a frame associated with the Multi-AP communication protocol; and means for onboarding the second Multi-AP device into a Multi-AP Network associated with the Multi-AP network configuration in accordance with establishing the Multi-AP network using the Multi-AP communication protocol and the DPP configuration information.

17. The first Multi-AP device of claim 16, wherein the DPP configuration information being derived using the DPP during a pre-onboarding process performed remotely by a network operator prior to deployment.

18. The first Multi-AP device of claim 16, wherein means establishing the Multi-AP network configuration between the first Multi-AP device and the second Multi-AP device using the Multi-AP communication protocol based, at least in part, on the DPP configuration information includes means for exchanging messages associated with the Multi-AP communication protocol that include one or more connectors derived using the DPP.

19. The first Multi-AP device of claim 16, wherein:
the Multi-AP communication protocol includes an IEEE 1905.1 protocol, and means for establishing the Multi-AP network configuration between the first Multi-AP device and the second Multi-AP device using the Multi-AP communication protocol based, at least in part, on the DPP configuration information includes means for exchanging IEEE 1905.1 messages that include one or more connectors derived using the DPP to establish an IEEE 1905.1 configuration.

20. The first Multi-AP device of claim 19, further comprising:
means for exchanging IEEE 802.11 messages including the one or more connectors to establish an IEEE 802.11 connection between the first Multi-AP device and the second Multi-AP device.

21. The first Multi-AP device of claim 16, further comprising:
means for determining a connector associated with the first Multi-AP device;
means for generating an IEEE 802.11 message including the connector;
means for digitally signing at least a portion of the IEEE 802.11 message including the connector with a configurator private signing key; and
means for providing the digitally signed IEEE 802.11 message to the second Multi-AP device for verification of the connector using a configurator public verification key.

22. The first Multi-AP device of claim 16, further comprising:
means for determining a connector associated with the first Multi-AP device;
means for generating an IEEE 1905.1 message including the connector;
means for digitally signing at least a portion of the IEEE 1905.1 message including the connector with a configurator private signing key; and
means for providing the digitally signed IEEE 1905.1 message to the second Multi-AP device for verification of the connector using a configurator public verification key.

23. The first Multi-AP device of claim 16, further comprising:
means for receiving, from a network operator, a bootstrap key associated with a network device being onboarded into the Multi-AP Network; and means for authenticating and configuring the network device using the DPP based, at least in part, on the bootstrap key received from the network operator.

24. A first Multi-AP device configured to onboard at least a second Multi-AP device using a device provisioning protocol (DPP) and a Multi-AP communication protocol, comprising:
a network interface configured to receive DPP configuration information associated with the second Multi-AP device; and
a processor coupled with the network interface, the processor configured to:
determine, during an onboarding process, the DPP configuration information;
establish a Multi-AP network configuration between the first Multi-AP device and the second Multi-AP device using the Multi-AP communication protocol based, at least in part, on the DPP configuration information, wherein the DPP configuration information is tunneled via a frame associated with the Multi-AP communication protocol; and
onboard the second Multi-AP device into a Multi-AP Network associated with the Multi-AP network configuration in accordance with establishing the Multi-AP network using the Multi-AP communication protocol and the DPP configuration information.

25. The first Multi-AP device of claim 24, wherein the DPP configuration information is received from a network operator, the DPP configuration information being derived using the DPP during a pre-onboarding process performed remotely by the network operator prior to deployment.

26. The first Multi-AP device of claim 24, wherein the processor configured to establish the Multi-AP network configuration between the first Multi-AP device and the second Multi-AP device using the Multi-AP communication protocol based, at least in part, on the DPP configuration information includes the processor configured to exchange messages associated with the Multi-AP communication protocol that include one or more connectors derived using the DPP.

27. The first Multi-AP device of claim 24, wherein the Multi-AP communication protocol includes an IEEE 1905.1 protocol, and the processor configured to establish the Multi-AP network configuration between the first Multi-AP device and the second Multi-AP device using the Multi-AP communication protocol based, at least in part, on the DPP configuration information includes the processor configured to prepare IEEE 1905.1 messages that include one or more connectors derived using the DPP for exchange via the network interface to establish an IEEE 1905.1 configuration.

28. The first Multi-AP device of claim 27, wherein the processor is further configured to prepare IEEE 802.11 messages including the one or more connectors for exchange via the network interface to establish an IEEE 802.11 connection between the first Multi-AP device and the second Multi-AP device.

29. A method for onboarding one or more Multi-AP devices using a device provisioning protocol (DPP) and a Multi-AP communication protocol, comprising:
determining, by a first Multi-AP device during an onboarding process, DPP configuration information derived using the DPP; and
establishing a Multi-AP network configuration between the first Multi-AP device and a second Multi-AP device using the Multi-AP communication protocol based, at least in part, on the DPP configuration information, wherein the Multi-AP communication protocol includes an IEEE 1905.1 protocol, and establishing the Multi-AP network configuration between the first Multi-AP device and the second Multi-AP device using the Multi-AP communication protocol based, at least in part, on the DPP configuration information includes tunneling the DPP configuration information via an IEEE 1905.1 frame, wherein the DPP configuration information includes one or more connectors derived using the DPP to establish an IEEE 1905.1 configuration.

30. The method of claim 29, further comprising:
exchanging IEEE 802.11 messages including the one or more connectors to establish an IEEE 802.11 connection between the first Multi-AP device and the second Multi-AP device.

31. A configurator station (STA) configured to use a device provisioning protocol (DPP) and a Multi-AP communication protocol, comprising:
a processor configured to:
initiate the DPP during an onboarding process for a first STA;
determine DPP configuration information based on DPP message exchanges between the configurator STA and the first STA according to the DPP; and
establish a Multi-AP network configuration between the first STA and a Multi-AP device of a Multi-AP network using the Multi-AP communication protocol based, at least in part, on the DPP configuration information, wherein the Multi-AP communication protocol includes an IEEE 1905.1 protocol, and establishing the Multi-AP network configuration between the first STA and the Multi-AP device using the Multi-AP communication protocol based, at least in part, on the DPP configuration information includes tunneling the DPP configuration information via an IEEE 1905.1 frame, wherein the DPP configuration information includes one or more connectors derived using the DPP to establish an IEEE 1905.1 configuration.

32. The first STA of claim 31, further comprising:
a network interface coupled with the processor and configured to:
provide the DPP configuration information to the Multi-AP device, wherein the Multi-AP device is configured to store the DPP configuration information and provide the DPP configuration information to a network operator.

33. The first STA of claim 31, wherein the configurator STA is configured as a DPP configurator, the first STA is configured as a DPP enrollee, and the Multi-AP device is a Multi-AP Controller or a Multi-AP Agent.

34. A first Multi-AP device configured to onboard one or more Multi-AP devices using a device provisioning protocol (DPP) and a Multi-AP communication protocol, comprising:
a processor configured to:
determine, during an onboarding process, DPP configuration information derived using the DPP; and
establish a Multi-AP network configuration between the first Multi-AP device and a second Multi-AP device using the Multi-AP communication protocol based, at least in part, on the DPP configuration information, wherein the Multi-AP communication protocol includes an IEEE 1905.1 protocol, and establishing the Multi-AP network configuration between the first Multi-AP device and the second Multi-AP device using the Multi-AP communication protocol based, at least in part, on the DPP configuration information includes tunneling the DPP configuration information via an IEEE 1905.1 frame, wherein the DPP configuration information includes one or more connectors derived using the DPP to establish an IEEE 1905.1 configuration.

35. The first Multi-AP device of claim 34, further comprising:
a network interface coupled with the processor and configured to:
exchange IEEE 802.11 messages including the one or more connectors to establish an IEEE 802.11 connection between the first Multi-AP device and the second Multi-AP device.

* * * * *